United States Patent
Ludwig et al.

(10) Patent No.: US 6,474,684 B1
(45) Date of Patent: Nov. 5, 2002

(54) DUAL STAGE INFLATOR

(75) Inventors: Christopher P. Ludwig, Fountain Hills; Robert S. Willhelm; John Bednarz, both of Mesa; Glade L. Hansen, Gilbert; Martin J. Muir, Scottsdale; Gregory J. Scaven, Mesa, all of AZ (US)

(73) Assignee: Talley Defense Systems, Inc., Mesa, AZ (US)

( * ) Notice: Subject to any disclaimer, the term of this patent is extended or adjusted under 35 U.S.C. 154(b) by 0 days.

(21) Appl. No.: 09/255,834

(22) Filed: Feb. 23, 1999

Related U.S. Application Data

(63) Continuation-in-part of application No. 08/842,485, filed on Apr. 24, 1997.

(51) Int. Cl.[7] ............................................. B60R 21/26
(52) U.S. Cl. ........................ 280/741; 280/736; 280/742
(58) Field of Search ............................... 280/741, 742, 280/736, 740

(56) References Cited

U.S. PATENT DOCUMENTS

| | | | |
|---|---|---|---|
| 3,758,131 A | 9/1973 | Stephenson et al. | 280/150 AB |
| 3,773,352 A | 11/1973 | Radke | 280/150 AB |
| 3,787,074 A | 1/1974 | Lewis et al. | 280/150 AB |
| 3,930,666 A | 1/1976 | Lynch et al. | 280/150 AB |
| 3,961,806 A | 6/1976 | Katter | 280/732 |
| 4,005,876 A * | 2/1977 | Jorgensen et al. | 280/736 |
| 4,213,635 A | 7/1980 | Inokuchi et al. | 280/737 |
| 4,561,675 A | 12/1985 | Adams et al. | 280/734 |
| 4,923,212 A | 5/1990 | Cuevas | 280/736 |
| 5,016,914 A | 5/1991 | Faigle et al. | 280/741 |
| 5,022,674 A | 6/1991 | Frantom et al. | 280/741 |
| 5,058,921 A | 10/1991 | Cuevas | 280/741 |
| 5,100,174 A | 3/1992 | Jasken et al. | 280/741 |
| 5,114,179 A | 5/1992 | Emery et al. | 280/741 |
| 5,139,280 A | 8/1992 | Cord et al. | 280/741 |
| 5,181,697 A | 1/1993 | Rumer | 267/116 |
| 5,186,491 A | 2/1993 | Yoshida et al. | 280/741 |
| 5,221,109 A | 6/1993 | Marchant | 280/736 |
| 5,286,054 A | 2/1994 | Cuevas | 280/738 |
| 5,294,414 A | 3/1994 | Brede et al. | 422/305 |
| 5,308,588 A | 5/1994 | Emery et al. | 422/165 |
| 5,310,214 A | 5/1994 | Cuevas | 280/729 |
| 5,346,254 A | 9/1994 | Esterberg | 280/741 |
| 5,351,988 A | 10/1994 | Bishop et al. | 280/737 |
| 5,364,127 A | 11/1994 | Cuevas | 280/741 |
| 5,366,239 A | 11/1994 | Headley | 280/728 A |
| 5,398,966 A | 3/1995 | Hock | 280/736 |
| 5,403,036 A | 4/1995 | Zakula et al. | 280/741 |
| 5,435,594 A | 7/1995 | Gille | 280/728.2 |
| 5,468,013 A | 11/1995 | Gille | 280/729 |
| 5,468,017 A | 11/1995 | Kirsch et al. | 280/741 |
| 5,492,365 A | 2/1996 | Bayley et al. | 280/741 |
| 5,513,879 A | 5/1996 | Patel et al. | 280/739 |
| 5,516,147 A | 5/1996 | Clark et al. | 280/737 |
| 5,529,335 A | 6/1996 | Böhmler | 280/741 |
| 5,536,040 A | 7/1996 | Cuevas et al. | 280/737 |
| 5,551,725 A | 9/1996 | Ludwig | 280/737 |

(List continued on next page.)

*Primary Examiner*—Eric Culbreth
(74) *Attorney, Agent, or Firm*—Fitzpatrick, Cella, Harper & Scinto

(57) ABSTRACT

A non-hybrid pyrotechnic filterless inflator, i.e., gas generator, for an automotive passive restraint air bag having a generally discoidally-shaped pressure vessel having a diameter that preferably is greater than or about equal to its height formed of a cup-shaped closure cap and a base member and having at least one exhaust nozzle for directing gaseous products out of the inflator and into the air bag. The pressure vessel contains two separated and independently initiated initiator assemblies. By initiating either one or both initiator assemblies, the inflator can generate a modulated gas output between a first minimum output level and a second maximum output level in response to passenger and driver conditions.

28 Claims, 15 Drawing Sheets

U.S. PATENT DOCUMENTS

| | | | |
|---|---|---|---|
| 5,553,889 A | 9/1996 | Hamilton et al. | 280/736 |
| 5,556,130 A | 9/1996 | Fulmer | 280/741 |
| 5,556,132 A | 9/1996 | Sampson | 280/741 |
| 5,558,367 A | 9/1996 | Cuevas | 280/737 |
| 5,564,743 A * | 10/1996 | Marchant | 280/736 |
| 5,566,976 A | 10/1996 | Cuevas | 280/737 |
| 5,575,499 A | 11/1996 | Kohno | 280/741 |
| 5,582,428 A * | 12/1996 | Buchanan et al. | 280/736 |
| 5,584,506 A | 12/1996 | Van Wynsberghe | 280/741 |
| 5,613,702 A | 3/1997 | Goetz | 280/735 |
| 5,621,183 A | 4/1997 | Bailey | 102/202.7 |
| 5,622,380 A | 4/1997 | Khandhadia et al. | 280/736 |
| 5,625,164 A | 4/1997 | McFarland et al. | 102/531 |
| 5,628,528 A | 5/1997 | DeSautelle et al. | 280/736 |
| 5,634,661 A | 6/1997 | Dahl et al. | 280/741 |
| 5,658,010 A * | 8/1997 | Steffens, Jr. et al. | 280/741 |
| 5,660,412 A | 8/1997 | Renfroe et al. | 280/737 |
| 5,690,357 A | 11/1997 | Cuevas | 280/737 |
| 5,709,406 A | 1/1998 | Buchanan | 280/737 |
| 5,725,243 A | 3/1998 | Skanberg | 280/737 |
| 5,762,368 A | 6/1998 | Faigle et al. | 280/737 |
| 5,779,266 A | 7/1998 | Moore et al. | 280/737 |
| 5,794,973 A | 8/1998 | O'Loughlin et al. | 280/737 |
| 5,799,972 A | 9/1998 | Handman et al. | 280/735 |
| 5,799,973 A | 9/1998 | Bauer et al. | 280/741 |
| 5,803,494 A | 9/1998 | Headley | 280/741 |
| 5,836,610 A | 11/1998 | Rink et al. | 280/736 |
| 5,839,754 A | 11/1998 | Schlüter et al. | 280/736 |
| 5,851,027 A | 12/1998 | DiGiacomo et al. | 280/736 |
| 5,863,066 A | 1/1999 | Blumenthal | 280/737 |
| 6,032,979 A * | 3/2000 | Mossi et al. | 280/741 |

* cited by examiner

DUAL STAGE INFLATOR

This application is a continuation-in-part of application Ser. No. 08/842,485 filed Apr. 24, 1997.

FIELD OF THE INVENTION

The invention relates to a gas-generating device or inflator suitable for rapidly inflating a flexible bag or filling a container to an elevated pressure. More specifically, this invention relates to a gas-generating device capable of modulated pressurization.

BACKGROUND OF THE INVENTION

Rapid gas-generating devices or inflators, as they are referred to in the art, have found widespread use. One use is in passive air bag restraint systems in order to reduce the large number of deaths and injuries occurring in automobile accidents annually. Air bags and inflatable belts for passive restraint systems are operatively associated with inflator devices which are generally activated by an inertial switch or sensor which detects rapid deceleration of a vehicle such as that which occurs upon impact between an automobile and another object. When the inertial switch is triggered, it causes an inflator to inflate a collapsed flexible bag or belt quickly which is deployed into a protective position in front of the occupant. The bag or belt must inflate extremely rapidly after the primary impact or collision in order to protect the occupants from injury caused by secondary impact or collision with the interior of the vehicle. In order to meet such criteria, the bag or belt should be fully inflated within about 10–65 milliseconds after inflation has been initiated.

A variety of conflicting considerations must be taken into account in developing an effective air bag passive restraint system. First, the inflator must be capable of producing and/or releasing a sufficient quantity of gas to the air bag within the time limitation required of a passive restraint air bag system, given the time limitation involved in air bag restraint systems, roughly about 10 to 15 milliseconds for side impact applications and about 30 to 65 milliseconds for driver and front passenger applications. Inflators must be capable of filling an air bag in these time frames with 15 to 50 liters of gas for side applications and 60 to 200 liters of gas for driver and front passenger applications. The specific amount and rate of gas generation or release is determined by the required air bag volume and the vehicle structural rigidity which influences the time between primary and secondary impacts.

Other considerations in designing an inflator for a passive air bag restraint system, particularly for automotive applications, include the toxicity and noxiousness of the gas which fills the air bag. That is, for air bags that deflate by releasing gas into the confines of the interior of the vehicle and in the case where the airbag ruptures, the inflator for an automotive air bag must generate or release gas and other materials which meet or surpass certain non-toxicity requirements in order to protect the occupants. Otherwise, toxic or noxious gas may injure or cause illness to the occupants. For example, the release of too much carbon monoxide could cause illness and even be deadly to the occupants. These toxicity requirements are controlled by certain specifications required by the automotive manufacturers. For example, a typical automotive requirement is that an inflatable air bag system meet certain specifications for a 100 cubic foot compartment. These toxicity specifications are set by health requirements and one reference which is helpful in defining those requirements is OSHA workplace breathing air standards, another reference is the American Conference of Governmental Hygienists' Allowable Limits for Short Term Exposure Levels for the Workplace.

In addition, the gas-generating composition may be highly toxic or unstable requiring special handling during the manufacturing process and creating disposal problems at the end of the useful life of the vehicle. For example, raw sodium azide which is used as the gas-generating composition in most airbag inflators today has a relatively high toxicity which creates handling problems during the manufacturing process.

Other considerations include that the gas and any other materials, for example solid particles, released into the air bag must meet energy transfer restrictions so that it will not burn or deteriorate the integrity of the air bag. Insuring that the energy and materials transferred during the inflation event do not burn, puncture or deteriorate the bag, protects the occupants from injury and insures proper bag inflation.

Packaging restrictions add a further consideration in the development of passive air bag inflators. For example, weight and size are primary factors in determining the suitability of vehicle inflator embodiments. Weight reduction translates into fuel economy improvements and size reduction into styling and design flexibility. For styling reasons and customer-acceptance, and so as not to interfere with the occupants' movement, comfort or the driver's line of vision, it is desirable to arrange the inflator so as not to be obtrusive, and yet have it positioned so that it effectively accomplishes its intended task. In order to accomplish these styling, customer-acceptance and engineering design parameters, the inflator must be capable of being packaged in a compact manner. For example, it is desirable to package the inflator in an air bag module which fits with the hub of the steering wheel while still allowing the use of the vehicle's horn by depressing any part of the steering wheel hub and while additionally allowing the use of the numerous control switches and stalks on the steering column. It is further advantageous for side impact bags to package the inflator and air bag module between the exterior door panel and the trim or panel in the interior of the door.

The emphasis on weight reduction for the purpose of fuel conservation in motorized vehicles, and the recent development of passenger air bags, rear-seat occupant air bags, side-impact air bags, seat-belt air bags and knee-bolster air bags as well as the contemplated use and development of air bags in the A and B pillars of vehicles and other small bags of 1 to 30 liters of volume, have created the need and demand for a light and compact inflation system.

There are basically two methods or systems which are employed to supply the gas in air bag restraint systems. In one method, the inflating gas is provided as a compressed gas stored onboard the vehicle within a pressure vessel. In the second method, the bag is inflated by igniting a pyrotechnic gas-generating propellant composition and directing the resultant gaseous combustion products into the bag. These two methods create three categories of inflators, the first relies solely upon a pressurized reservoir of gas, the second upon burning a combustible propellant to generate all of the gas to fill the air bag, the third upon a combination of the two described methods to inflate the air bag, and is known in the art as a hybrid inflator.

The first method requires a reservoir of gas stored onboard the vehicle at a very high pressure which is discharged into the bag immediately upon sensing the impact. In order to inflate the vehicle occupant restraint bag in the required time of 0.010 to 0.065 seconds, that is to attain a fill volume rate of at least about 900 liters per second and preferably approximately 3,000 liters per second, a relatively large reservoir of gas at pressures of 3,000 pounds per square inch ("psi") is stored in a pressure vessel. To open the pressure vessel in the short time interval required to inflate the air bag, explosive actuated arrangements are employed for bursting a diaphragm or cutting through a structural portion of the reservoir.

In the second method, a pyrotechnic gas generator having an ignitable and rapid-burning gas-generating propellant composition burns to produce substantial volumes of hot gaseous products which are directed into the inflatable bag. These gas generators must withstand thermal and mechanical stresses during the gas-generating process. Specifically, the gas-generating propellant ignites, combusts and burns at elevated temperatures and pressures which require the casing (pressure vessel) surrounding the gas-generant to be capable of safely withstanding these elevated pressures at a specified safety factor. These strength requirements result in a large, bulky and heavy inflator typically of toroidal shape for driver-side applications.

Typically, there is a center chamber in these gas-generating inflators used for pyrotechnic ignition-enhancers and auto-ignition materials ("AIM"). The center chamber is concentrically surrounded by one or more separate chambers in fluid connection with each other and with the center chamber, the concentric chamber typically contains the main propellant charge and filter. Structural members divide the concentric chambers and are connected to the outer pressure vessel usually by means of a weld, rivet, screw thread or other mechanical fastening means. These structural members typically form a central post construction for the pressure vessel which adds to the strength, weight and size of the inflator.

Pyrotechnic compositions typically comprise a fuel and an oxidizer. Because gas-generants, including sodium azide which is used today in most passive restraint systems, and most pyrotechnic oxidizers typically produce significant amounts of solid particulates, filters are typically incorporated into the inflator to separate the hot particles from the gas prior to exhausting the inflating gas into the air bag. The solids produced during combustion are separated from the gas stream to prevent the particles from rupturing the bag and injuring occupants. In addition, as described above, it is important to produce an inflator gas having a temperature which is sufficiently low to avoid burning or deteriorating the integrity of the air bag or belt. However, gas-generants which burn faster and better at lower temperatures tend to produce significant quantities of particulates making filters all the more important when using these low temperature-burning gas-generating materials.

In addition, the filters in prior art inflators also acted as a heat sink to reduce the temperature of the gaseous products filling the air bag. The filters which are usually made from metal are helpful in absorbing the heat from the gaseous products and often provide a torturous path for the gaseous products to travel which further absorbs the energy of the gaseous products in order to protect the integrity of the air bag or belt.

The structural members forming the central post construction and filters in these gas-generating inflators add weight, complexity, cost and bulk to the inflators. For the reasons described, decreasing weight and size are desirable in the design of automotive inflators for passive air bag restraint systems. Although there have been inflator designs which have deviated from these typical designs, they still include the disadvantages of filters or central post construction or other bulky designs. For example, U.S. Pat. No. 5,556,130 describes a pyrotechnic inflator having a generally cylindrical pressure vessel formed of sheet metal which includes an annular filter comprising a plurality of convolutions of metal screen having decreasing mesh size as it progresses to the outside of the filter where it abuts against the pressure vessel walls. U.S. Pat. No. 4,923,212 discloses a pyrotechnic inflator having a domed pressure vessel which includes an annular filter abutting against the pressure vessel walls. In both of these patents, the filter adds to the weight, size and complexity of the inflator design.

U.S. Pat. No. 5,551,725 discloses several inflator embodiments. Two embodiments include a cylindrical tubularly-shaped pressure vessel which is relatively bulky, having a length substantially larger than its diameter and which relies on the ignition-enhancing materials being blown into the portion of the pressure vessel containing the gas-generant composition to provide quick and efficient mixing and burning with the main gas-generant. This embodiment disadvantageously relies on a bulky, large and inconveniently shaped pressure vessel which is difficult to use in many applications and is not sized to be a drop-in replacement for existing inflators. The other embodiment of the invention disclosed in U.S. Pat. No. 5,551,725 relies on a toroidally-shaped pressure vessel having a structural central post structure which disadvantageously adds to the bulk, weight and complexity of the inflator.

The third category, the hybrid inflation system, utilizes a gas-generating propellant composition and a pressurized medium to meet the requirements of air bag restraint systems. As such, a hybrid inflator suffers many of the drawbacks of the other two categories of inflator designs, and is often of complex configuration. These hybrid systems typically store pressurized gas at about 3,000 psi. In operation, they burn gas-generating propellant grains to produce heated gas as well as to heat the stored gas. Hybrid inflators produce less solid particles since less solid particulate producing gas-generant can be used to obtain the same inflator gas output. In addition, the stored pressurized gas cools the gas which flows into the inflator.

The combination of greater condensation of solids within the inflator and the reduction of solids produced allows some hybrid inflators to operate without filters. Current driver-side hybrid inflators are toroidal in shape with a center chamber typically used for the hybrid heater assemblies surrounded by one or more separate chambers in fluid connection typically containing the pressurized gas. Structural members divide the concentric chambers and are connected to the outer pressure wall usually by weld, rivet, screw thread or other mechanical fastening means. Hybrid inflators have a number of drawbacks: first they are more complicated and have more parts. Second, there is higher cost associated with more parts and the additional handling and assembly operations. Third, they are larger and heavier because the inflator energy is in part stored as a pressurized gas rather than a solid and fourth, they have decreased reliability resulting from storing the pressurized gas over the lifetime of the vehicle.

Recent efforts aimed at making passive occupant restraint systems even more effective at reducing the risk of injuries have called for the development of advanced air bags. Such air bags should be able to modulate or otherwise control air bag deployment based upon the size, weight and/or location of the vehicle occupants. Previous attempts to compensate for the size differential between, for instance, a child and an adult include U.S. Pat. No. 5,310,214 directed to an air bag system having an air bag made of two separate gas sources in an attempt to protect both a child and an adult and U.S. Pat. No. 5,058,921 directed to an inflator module arranged to simultaneously develop, within a single air bag, two different inflation zones. However, these attempts have not taken into account the location of the occupants relative to the airbag nor have they modulated the deployment of a single airbag by providing bag inflation modulated between two different gas output levels.

Additional efforts have been directed to producing a gas discharge equivalent to having two discrete inflators capable of being fired independently. Such dual discharge inflators typically have a first discharge which is 60–70% of the discharge level provided by an inflator sized to protect an unbelted $50^{th}$ percentile (or average size) male adult. This first discharge provides a lower gas inflation rate to the airbag as well as a lower total amount of gas with which to fill the bag at the completion of the inflation event. The reduced inflation rate results in lower bag velocities while the airbag is exiting the airbag module.

The second discharge is provided by these dual discharge inflators when both discrete inflators are fired simultaneously. The second discharge, equal to the sum of the discharges of two independent inflators, is generally sized to provide an output adequate to protect an unbelted $50^{th}$ percentile adult male. The second discharge provides both the maximum gas inflation rate and maximum total amount of gas with which to fill the bag.

OBJECTS OF THE INVENTION

It is thus an object of the present invention to provide an inflator with reduced weight, size and with fewer geometric constraints on its design and packaging. It is a further object to provide a simple, compact and light-weight inflator. It is a still further object to eliminate the need for a filter in an inflator. It is another object to provide a gas-generating inflator which eliminates or at least reduces the size of internal structural members of the pressure vessel and their attachment means. It is a further object of the invention to provide a less costly inflator both in terms of fewer parts and fewer and less costly manufacturing operations to assemble and which yet may serve as a drop-in replacement for existing toroidal driver-side air bag inflators. Another object of the invention is to provide a dual stage driver inflator having a single pressure vessel that is capable of producing a modulated output with respect to the speed and force of an air bag deployment between a first minimum level and a second maximum level based upon sensor input relating to such factors as crash severity, seat-rack position, occupant weight and/or size, occupant location relative to the air bag, and whether or not the occupants are wearing seat belts.

SUMMARY OF THE INVENTION

These objects are achieved by the use of a non-azide, filterless, gas-generating, pyrotechnic, inflator which eliminates the structural members which typically divide the concentric chambers and which are connected to the outer pressure vessel walls in a toroidally-shaped inflator. The present invention comprises a non-hybrid pyrotechnic filterless inflator, i.e., gas generator, configured and adapted to provide a sufficient amount of non-toxic, non-noxious gaseous product by the combustion of a non-azide pyrotechnic propellant composition stored within a housing (pressure vessel) for substantially inflating an automotive passive restraint air bag device in the time period between the occurrence of a primary collision between the vehicle and another object and a secondary collision occurring between the occupant(s) and the interior of the vehicle.

The inflator of the present invention comprises a generally discoidally-shaped pressure vessel formed of a cup-shaped base member defining a central opening which receives an initiator assembly and a cup-shaped closure cap defining at least one exhaust nozzle for directing gaseous products out of the inflator and into the air bag. As used herein the term "discoidal" or "discoidally-shaped" when used with reference to a pressure vessel refers to a pressure vessel having a shape wherein the diameter is greater than or about equal to its height and which lacks the central post structure forming a separate central chamber that is typical of prior art toroidal pressure vessel structures. An environmental seal may be provided over the exhaust nozzle to prevent contamination of the interior components of the inflator during periods of non-use and to allow pressure to build up within the inflator upon initiation of the pyrotechnic reaction. The pressure vessel may advantageously contain a mechanical interface for connecting the inflator to the air bag module.

A gas-generant assembly comprising a stamped metal cup which contains the main pyrotechnic gas-generating propellant composition is positioned about and in some embodiments in contact with the initiator assembly and preferably spaced a small distance from the walls of the pressure vessel. The gas-generating composition is preferably a low solids producing formulation configured in the form of pellets or tablets. The gas-generant cup contains numerous openings along its walls for allowing the gaseous products produced by the combustion of the gas-generating propellant composition to escape the gas-generant cup. These openings are preferably configured to be smaller than the size and configuration of the gas-generating composition pellets. Preferably, the gas-generating cup assembly includes a spring-loaded lid to keep the gas-generating pellets from moving within the inflator which can cause disturbing rattling noises and also deterioration and crumbling of the gas propellant tablets and resulting leakage of the gas-generating composition outside of the gas-generant assembly. The gas-generant cup is not attached to the closure cap and forms no structural part of the pressure vessel but acts as a receptacle to position the gas-generating composition about the initiator assembly. The initiator assembly comprises an initiator plug received in the central opening in the base member, a standard initiator which ignites the gas-generating products or ignition-enhancing materials in the inflator and electrical connections to connect the initiator to a crash-sensing diagnostic system.

In an alternate embodiment, the inflator also may contain an enhancer cup assembly which comprises a stamped metal cup defining numerous gas ports about its walls and an ignition-enhancing charge material placed inside the cup. The gas ports in the cup are sealed with a burst foil to prevent migration of the ignition-enhancing charge and to allow a build up of pressure within the enhancer cup before burst of the foil seal. The enhancer cup is positioned about the initiator assembly to place the ignition-enhancing charge about and in contact with the initiator. The ignition-enhancing material provides sufficient heat and pressure to ignite the main gas-generating composition and is preferably a fast-burning, low solids-producing formulation. The enhancer cup is not attached to the closure cap and forms no structural part of the pressure vessel of the inflator. In this embodiment, the gas-generating cup assembly is positioned concentrically about the enhancer cup assembly.

In another embodiment, the inflator also may contain an AIM ("auto-ignition materials") assembly to provide safe ignition of the main gas-generating composition of the inflator when it is subject to a bonfire environment. The AIM assembly comprises AIM powder packaged in a thin metal cup containing a seal. The AIM assembly can be used in conjunction with or alternatively without the enhancer cup assembly. The AIM cup is preferably in abutting relationship with at least one wall of the pressure vessel.

The advantages of the present inflator design are a smaller package with a simpler, lighter and less costly design. The lower cost of the gas-generating inflator of the invention is achieved through the elimination of or lighter weight internal structural hardware and their attachments. The lower cost is achieved also by eliminating the filter typically found in most gas-generating inflators. The lower cost of the inflator of the invention is achieved also because fewer and less costly manufacturing operations are required to assemble the inflator. The invention is advantageous also because of its smaller, more compact size. The size advantage also is achieved by eliminating the filter and by eliminating or reducing the heft, strength and bulk of any internally fastened structural center post components thereby resulting in a lighter, smaller inflator.

In another embodiment, the present invention is directed to a dual stage inflator capable of producing at least a first output level and a second output level. The dual stage inflator includes a pressure vessel having at least one exhaust nozzle adapted to permit passage of gases within the pressure vessel out of the pressure vessel. The pressure vessel includes a first chamber. The first chamber includes a first gas-generant charge present in an amount sufficient to generate the first output level and a first initiator assembly adjacent said first gas-generant charge and capable of initiating said first charge. The pressure vessel also includes a second chamber. The second chamber includes a second gas-generant charge present in an amount sufficient to generate enough output to combine with the first output level to form the second output level and a second initiator assembly adjacent the second gas-generant charge and capable of initiating said second charge independent of the first charge.

In another embodiment, the second chamber is separated from the first chamber by a one-way seal permitting passage of gas from the second chamber to the first chamber but inhibiting passage of gas from the first chamber to the second chamber.

In yet another embodiment, the first chamber further may include a first gas generant cup having sidewalls and containing the first gas-generant charge and a lid positioned across an open top of the first gas-generant cup. In this embodiment, the second chamber is disposed within the sidewalls. In still yet another embodiment, the second chamber includes a cylinder having a bottom and a top and extending into the first chamber, the cylinder bottom sealed against the pressure vessel and the cylinder top sealed by the one-way gas seal. The first gas-generant cup may also include a plurality of gas ports disposed around the sidewalls. The gas ports are not aligned with the exhaust ports in the pressure vessel.

In order to protect the dual stage inflator from excessive temperatures, the inflator may include an auto-ignition powder for igniting the gas-generating charge at a temperature lower than ignition temperature of the gas-generating charge. In another embodiment, the auto-ignition powder is disposed adjacent the cylinder bottom in the second chamber and is bounded by cylinder walls, an internal collar of the second initiator assembly sealing the cylinder bottom, and a pad. In yet another embodiment, the auto-ignition powder is disposed within a cartridge, and the cartridge passes through the first gas-generant cup into the first chamber.

In order to release gases, the pressure vessel may include two exhaust nozzles disposed on opposite sides of the pressure vessel, and the inflator may include a shroud covering the pressure vessel. The shroud includes a plurality of vents disposed around the shroud, the vents not aligning with the exhaust ports. In another embodiment, the vents are spaced around the shroud at an angle from about 42° to about 48°.

The inflator may further include a sensor connected to the first and second initiator assemblies and capable of initiating the initiator assemblies either independently or simultaneously. In another embodiment, the sensor detects rapid vehicle deceleration and initiates the initiator assemblies based upon vehicle speed, crash severity, seat rack position, passenger weight, passenger size, passenger location, seat belt use, or combinations thereof. The sensor can be provided in the inflator itself or as an independent assembly.

The second initiator assembly can be initiated after the first initiator assembly. Alternatively, the second initiator assembly can be initiated after the first initiator following a delay after the initiation of the first initiator of about greater than 0 milliseconds to about 40 milliseconds.

Examples of the gas-generant charges include a non-azide, low-solids producing gas-generating composition. The composition produces a gaseous product upon combustion. The gas-generating composition includes guanidine nitrate, and an oxidizer comprising a mixture of ammonium perchlorate and sodium nitrate. In another embodiment, the inflator includes from 54 to about 67 percent guanidine nitrate and from about 33 to about 46 percent oxidizer wherein the oxidizer includes ammonium perchlorate and sodium nitrate in a mole ratio of about 1 mole of ammonium perchlorate to about 1 to about 4 moles of sodium nitrate. In yet another embodiment, the gas-generating composition includes about 55–65 percent guanidine nitrate, about 20–25 percent ammonium perchlorate and about 15–20 percent sodium nitrate. In still yet another embodiment, the gas-generating composition includes about 59 percent guanidine nitrate, about 23 percent ammonium perchlorate and about 18 percent sodium nitrate.

The present invention includes an air bag system or use in an automobile. The air bag system includes an air bag having an open end and the dual stage inflator of the present invention disposed in the open end for modulating the inflation rate of the air bag at between either a first or a second rate and the inflation amount between either a first or a second peak upon detection of rapid vehicle deceleration.

The present invention is also directed to a method or producing either a first gas output level or a second gas output level for charging a pressurizable container. This method includes determining a desired output level and producing either a first output level having a first mass flow rate and a first total mass of gas or a second output level having a second mass flow rate and a second total mass of gas, wherein the ratio of the second total mass of gas to the first total mass of gas is less than the ratio of the second mass flow rate to the first mass flow rate. In the case of a pressurizable tank, the mass flow rate corresponds to the change in pressure over time (dp/dt), and the total mass of gas corresponds to the peak pressure in the tank.

DETAILED DESCRIPTION OF THE INVENTION

Figure 1:
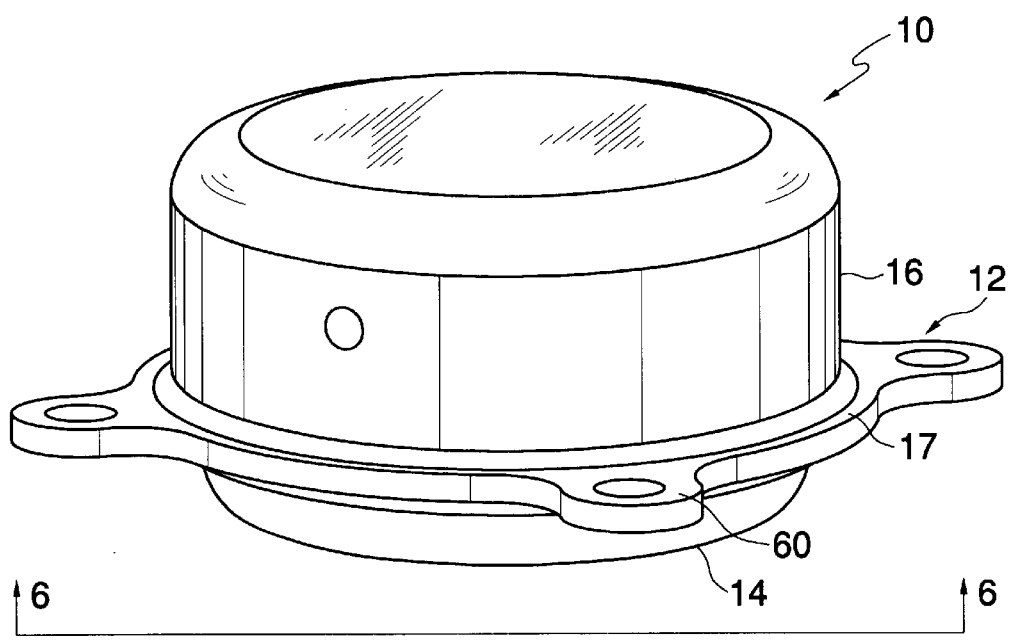
FIG. 1 is a perspective view of the inflator of the invention.

Reference will now be made in detail to the embodiments and methods of the invention as illustrated in the accompanying drawings. In the drawings, like reference characters designate like or corresponding parts throughout the drawings.

The following descriptions and illustrations are generally of the preferred embodiments of the invention and are provided only to illustrate various specific configurations and applications of the present invention. This description relates generally to inflators for a driver's side air bag. The inflators may be used for other automotive passive restraint air bags or belt systems. In addition, the air bag applications of the inflators of the present invention are only illustrative and the inflators may be used in many other applications such as evacuation slides, flotation devices, rafts, etc., and many modifications and variations on the illustrated embodiments may be made without departing from the spirit and scope of the invention.

FIG. 1 illustrates the pyrotechnic, non-hybrid filterless inflator of the invention in the form of a vehicle passive restraint air bag inflator 10 suitable for application as the inflator for a driver's-side air bag unit of approximately 60 liters. Such an air bag unit is located typically in a housing (not shown) in the hub of the steering column of the vehicle with an inflator mounted in the housing and coupled in fluid communication with a deflated and stored air bag (not shown).

Referring to FIGS. 1–6, inflator 10 comprises a pressure vessel 12 having a base member 14 formed of a stamped metal cup welded at 13 to a closure cap 16. Closure cap 16 may contain an integral flange 17 on its open end to serve as the mechanical interface for connection to the air bag module (not shown). In this regard, flange 17 has mounting means 60 which in this case is four through-holes defined in the flange which are adapted and configured to receive fastening means, such as for example, a bolt or rivet, to attach the inflator to the housing in the steering column.

Preferably, and for illustrative purposes, the pressure vessel 12 is discoidal in shape having a diameter A of approximately 2.4 (60 mm) inches and a height B of approximately 1.4 (35 mm) inches and is configured to replace standard toroidal design inflators used in current driver-side air bag modules. Any materials suitable for the required operating conditions may be used. Preferably, the base member 14 is 0.120 inch thick Nitronic® (200 series) stainless steel while the closure cap 16 is 0.093 inch thick Nitronic® (200 series) stainless steel. Normal operating pressures of the exemplary preferred inflator are in the range of 5,000 to 10,000 psi over the operating temperature range of −35° C. to +85° C.

The center of the base member 14 defines an opening 11 which is fitted with an initiator assembly 15. Initiator assembly 15 comprises an initiator plug 18, an initiator 22 and shorting clip assembly (not shown) to connect the inflator to a crash-sensing diagnostic system (not shown). The initiator plug 18 preferably is welded at 19 to the base member 14 but may otherwise be connected and sealed to the base member 14 by other known or equivalent means. The base member or metal cup 14 and initiator plug 18 form a base assembly 21.

The initiator plug 18 contains a flange 24 configured and adapted to retain a standard automotive initiator 22. The initiator plug 18 orients and interfaces with the initiator's shorting clip assembly (not shown) and the initiator 22, which is a dual pin electrical interface configured to connect to a standard inflator connector (not shown). The initiator 22 is a standard automotive inflator component manufactured by various suppliers. The initiator converts the electrical signal received from the vehicle's crash-sensing diagnostic system (not shown) into a pyrotechnic output through the use of a bridgewire in a manner well-known to those skilled in the art. The standard initiator 22 along with an initiator seal 26 is held in the initiator plug 18 by crimping flange 24. The initiator seal 26 helps form a gas-tight seal between the initiator 22 and the initiator plug 18.

The inflator of the present invention preferably contains auto-ignition materials ("AIM"). AIM minimizes the risk of inflator over-pressurization in the event of exposure to unintended external heating, such as for example a fire, by igniting and then setting off the main charge at a temperature low enough to allow the inflator to operate as intended. The AIM is packaged inside the inflator to provide safe ignition of the internal components when subjected to a bonfire environment. The AIM cup assembly 30 comprises AIM powder 32 packaged preferably into a thin stamped metal cup 34 having, for example, a Mylar® seal 36. Thin metal cup 34 may be formed, for example, of about 0.005 to about 0.015 inches thick 300 series stainless steel. The material and thickness of metal cup 34 is not critical so long as it is inert to the materials used in the inflator and can hold and keep the AIM powder 32 separated in the inflator.

The AIM cup assembly 30 preferably is press-fitted onto the enhancer cup assembly 40 which comprises a stamped generally U-shaped metal container 42 referred to as the enhancer container and an ignition-enhancing charge 45.

The metal container 42 may be about 0.060 inch thick 300 series stainless steel. The enhancer container 42 has a central through-hole 43 to accommodate the AIM cup assembly 30. Container 42 also has gas ports 44 formed in its side walls and preferably may have eight gas ports each having a diameter of approximately one-eight of an inch. After pressing the AIM cup assembly into the enhancer container 42, a thin burst foil 46 approximately 0.001 inches thick and preferably formed of metal, for example such as copper, is placed over the gas ports 44 to form a powder seal. An ignition-enhancing charge 45 is added to the container 42 and the container is press-fitted over the initiator plug 18. The container 42 positions the ignition-enhancing charge 45 around and in contact with the output end of the initiator 22 to aid in ignition transfer. Enhancer container 42 is not connected to the closure cap 16 and forms no structural part of the pressure vessel. Since the enhancer container 42 forms no structural part of the pressure vessel 12, its thickness and material composition are not critical so long as it positions the ignition-enhancer material 45 about the initiator 22 and is relatively inert with the inflator components.

The ignition-enhancing charge 45 provides enough heat and pressure to ignite the main gas-generating propellant charge. The ignition-enhancing charge 45 is preferably a fast-burning, low solids-producing formulation such as, for example, one of the formulations described in U.S. Pat. No. 5,780,768, issued Jul. 14, 1998, the entire disclosure of which is incorporated herein by reference.

As used herein, the terms "low solids" and "low level of solids" mean that upon combustion the ignition enhancing charge or gas-generant charge produces substantially lower solids than ignition enhancing charges or gas-generant charges used in prior art inflators, which produce about 60 percent solids upon combustion. The ignition-enhancing charge and gas-generant charge of the present invention preferable produce less than about 15 percent solids upon combustion.

Approximately 1.5 to approximately 2.5 grams of material having a formula of about 30.0 weight percent (wt. %) guanidine nitrate ($CH_6N_4O_3$); about 21.3 wt. % ammonium perchlorate; about 16.2 wt. % sodium nitrate; about 32.3% hexahydro-1,3,5-trinitro-1,3,5-triazine (RDX) and about 0.2 wt. % silicon dioxide, for example, has been demonstrated to be successful as an ignition-enhancing material and is thus a preferred ignition-enhancing material. The enhancer material may be in powder, tablet, pellet or other form and is preferably in granular form. The thin metal burst foil 46 may be formed of any suitably inert material which will not react with the inflator components. The burst foil 46 serves to maintain the ignition-enhancing material 45 in the container 42 and allows pressure to build up in the enhancer container 42 prior to rupturing. After ignition of the ignition-enhancing material 45, heat and gas are generated in the enhancer container 42 which causes rupture of the burst foil 46 covering the eight gas ports 44 thereby releasing gases into the cavity containing the main propellant charge material. The gases produced by the ignition-enhancing material are of sufficient quantity and temperature to ignite the main propellant charge.

A gas-generant cup assembly 50 is positioned around the enhancer cup assembly 40 and comprises a gas-generant cup 54 and gas-generant charge 55. The gas-generant cup 54 may be press-fitted onto the enhancer cup assembly 40 and may, for example, be a thin stamped metal cup with numerous small gas ports 52 in the side walls around the perimeter of cup 54 to allow gas to escape while retaining the gas-generant charge 55 within cup 54 during combustion. The gas-generant cup 54 is not attached to the closure cap 16 and forms no structural part of the pressure vessel 12. The thickness and material of the gas-generant cup 54 is not critical so long as it is inert to the inflator components and encloses and separates the gas-generant charge 55 and positions the gas-generant materials about the enhancer assembly and/or initiator. Stainless steel (300 series) having a thickness of about 0.020 to about 0.040 inches has been successfully used for the gas-generant cup.

Figure 2:
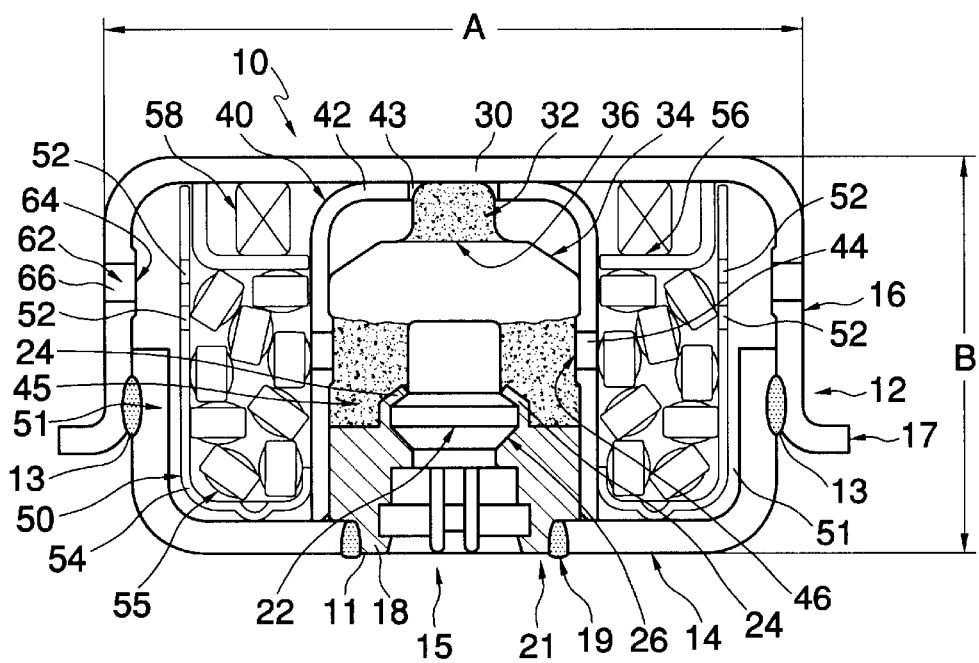
FIG. 2 is a cross-sectional view of the inflator of the invention.

The gas-generating composition is a non-azide formulation and preferably is a low solids-producing gas-generating composition such as those described in U.S. Pat. No. 5,780,768. In the embodiment of FIG. 2, preferably approximately 10 to approximately 25 grams of gas-generant pressed into pellet form having a formula of about 58.5 wt. % guanidine nitrate; about 23.5 wt. % ammonium perchlorate; about 17.8 wt. % sodium nitrate and about 0.2 wt. % sodium dioxide has been successful in producing substantially non-toxic, non-noxious gas at a rate and with enough volume to fill a driver's-side air bag within the required time limitations to protect a vehicle occupant and without damaging the integrity of the air bag itself. This composition is disclosed only for purposes of illustration however and does not limit the invention in any way for use with a variety of other gas-generant compositions.

The gas-generant charge 55 may be liquid, powder, granular or pressed into pellet, tablet or any other form to provide the required mass generation rate for specific vehicle applications. The quantity and configuration of gas-generant charge 55 can be varied to meet different requirements. The main propellant gases exit the gas-generant cup 54 through the gas ports 52. The gas ports 52 are preferably designed to be smaller than the gas-generant charge 55 to prevent the gas-generant charge from leaving the cup 54. In some embodiments, the gas ports 52 may be sealed by a foil for example. In the preferred design, there are ninety (90) gas ports 52 each 0.085 inch in diameter located in two rows around the perimeter of the cup 54. The large number of gas ports 52 and resulting flow area are configured to minimize pressure drop across the main charge cup 54 during operation.

The gas-generant 55 is added to the generant cup 54 and a stamped metal lid 56 is placed over the gas-generant 55 and held in place by a standard steel spring or wave washer 58. The lid 56 keeps the main gas-generant in place during handling of the inflator and prevents any noise or gas-generant pellet rattle which could occur as a result of settling of the gas-generant 55 and/or movement of the inflator.

The gas-generant cup 54 preferably is positioned to provide an air gap 51 between the pressure vessel 12 and the gas-generant cup 54. The air gap 51 provides insulation for the gas-generant in the event the inflator 10 is subjected to the effects of a fire. The air gap 51 and AIM cup assembly 30 ensures that the unit does not malfunction and over pressurize during a fire. The air gap 51 becomes more important with the use of lower melting point gas-generant materials.

More specifically, the AIM material is designed to ignite at a temperature which is lower than the temperature at which the strength of the material out of which the pressure vessel is formed begins to deteriorate or at which the other energetic materials begin to decompose, melt or otherwise deteriorate. The AIM material thereafter ignites the ignition-enhancing material and/or the main gas-generating charge to initiate the inflator. By igniting the AIM material before the strength of the pressure vessel deteriorates, the potential problem of the inflator attaining a pressure which exceeds the strength of the pressure vessel, creating the risk of the pressure vessel over pressurizing and injuring people and property, is avoided.

The closure cap 16 is a stamped metal cup which is provided with flange 17 and mounting means 60 for the inflator with fasteners such as bolts, screws or rivets. Cap 16 defines a plurality of exhaust nozzles 62 configured and adapted to direct gases out of the inflator and into the air bag. The preferred design has two exhaust nozzles 62 each having a diameter of approximately 0.1 to approximately 0.15 inches. The inner aspect of exhaust nozzles 62 is covered prior to use with a thin foil burst membrane 64 preferably being approximately 0.001 inches thick copper foil.

The closure cap 16 is press-fitted onto the base member 14 whereupon it contacts the AIM cup assembly 30 and is welded at 13 to form the pressure vessel 12. The enhancer container 42 and generant cup 54 are not however, as noted above, attached structurally to the closure cap 16. A sealant 66 may be added to the nozzles 62 to provide in combination with burst membrane 64 an environmental seal, an anti-tamper barrier and to allow a build up of pressure in the inflator prior to rupture. Suitable sealants include silicone rubbers or room temperature vulcanizing rubbers (RTV).

Inflator 10 does not require a filter which typically is used to separate the hot gas-generant particles from entering the air bag with the combustion gases and thus eliminates this bulky, space-consuming and heavy feature and its associated manufacturing and part cost. This is due mainly to use of non-azide clean-burning gas-generant, not to the construction of inflator 10. Upon rupture, the inflator gases flow into the air bag, pressurizing the airbag volume to extend the bag and provide occupant impact protection.

Figure 3:
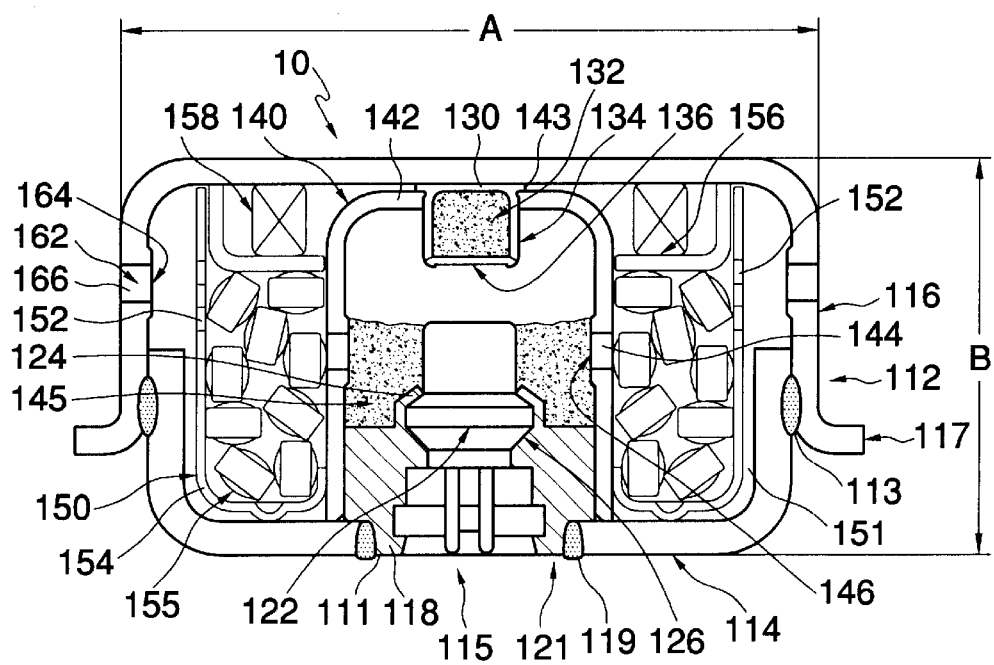
FIG. 3 is a cross-sectional view of an alternate embodiment of the inflator of FIG. 1.

The configuration and design of the embodiment of inflator 10 illustrated in FIG. 3 is similar in most aspects to the embodiment shown in FIG. 2 except that the FIG. 3 embodiment utilizes an alternative assembly method and design for the enhancer container 142 and AIM assembly 130. As shown in FIG. 3, the enhancer container 142 is pressed onto the initiator assembly and the enhancer material 145 is loaded through the top of the enhancer container through hole 143. A different AIM cup assembly 130 is incorporated comprising of a metal AIM cartridge 134 (similar to a pistol or rifle blank) having AIM material 132 held in place by a crimped in-place seal 136. Assembly 130 may be pressed into the top through-hole 143 of the enhancer cup 142. The AIM cup assembly 130 is further secured in place when the closure cap 116 is pressed onto the base member 114. This embodiment may offer manufacturing advantages in the area of pyrotechnic handling.

Figure 4:
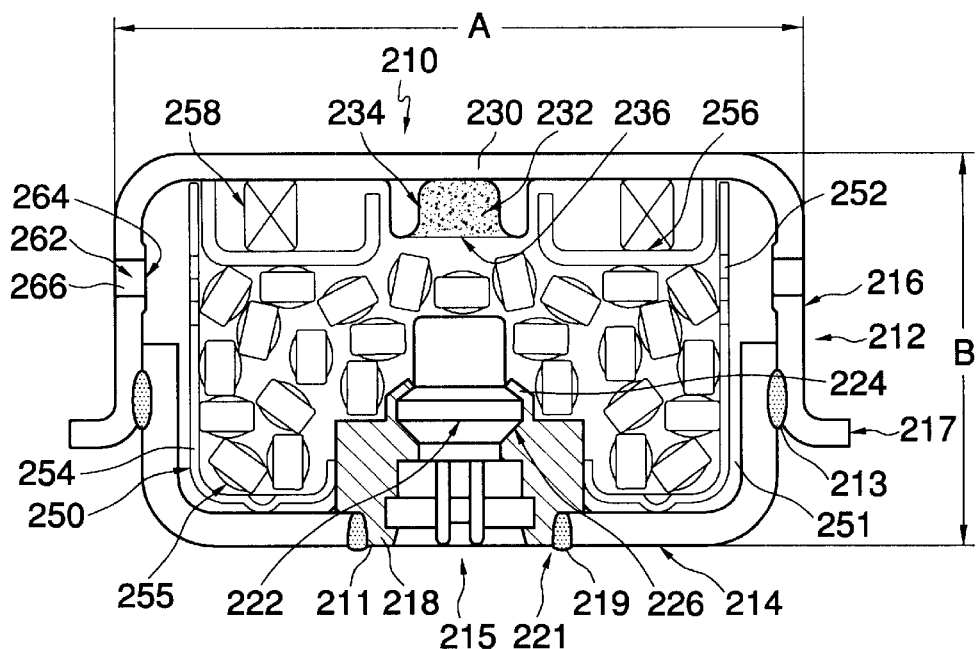
FIG. 4 is a cross-sectional view of another alternate embodiment of the inflator of FIG. 1.

The embodiment of FIG. 4 is similar in construction to FIGS. 2 and 3 but reduces the number of parts required to form the inflator 10 by eliminating the enhancer assembly 40, 140. In FIG. 4, the gas-generant cup 254 is pressed onto the initiator assembly 215. Gas-generant material 255, in this case in the form of pellets, is added to the gas-generant cup 254. Gas-generant lid 256 and spring 258 are placed over the gas-generant material 255. AIM cup assembly 230, comprising AIM cup 234, AIM material 232 and AIM seal 236 may be attached to closure cap 216 or held in place by lid 256. AIM assembly 230 is in contact with the closure cup 216 in assembled form.

Figure 5:
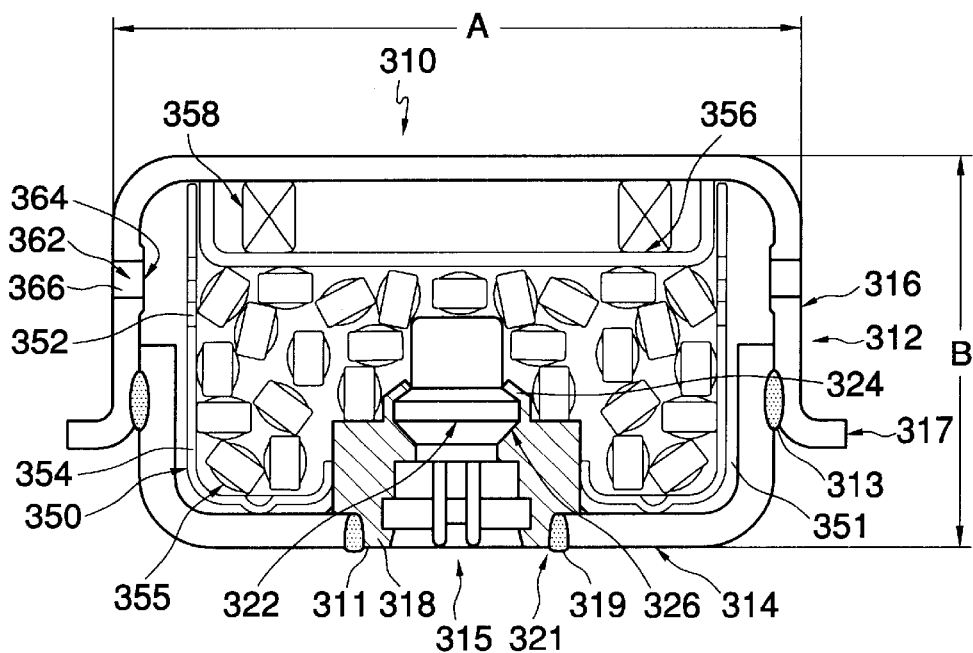
FIG. 5 is a cross-sectional view of a still further embodiment of the inflator of FIG. 1.

The embodiment of FIG. 5 is similar in configuration to the embodiment of FIG. 4 but offers a further reduction in the number of parts by eliminating the AIM cup assembly.

In FIG. 5, the gas-generant cup 350 is pressed onto the initiator assembly 315. Gas-generant material 355 is added to the gas-generant cup 354 and the gas-generant lid 356 is placed over the gas-generant material 355 and retained by spring 358. The designs of FIGS. 4 and 5 simplify the design resulting in lower cost, both in terms of manufacturing and part cost, and reduced weight.

Figure 6:
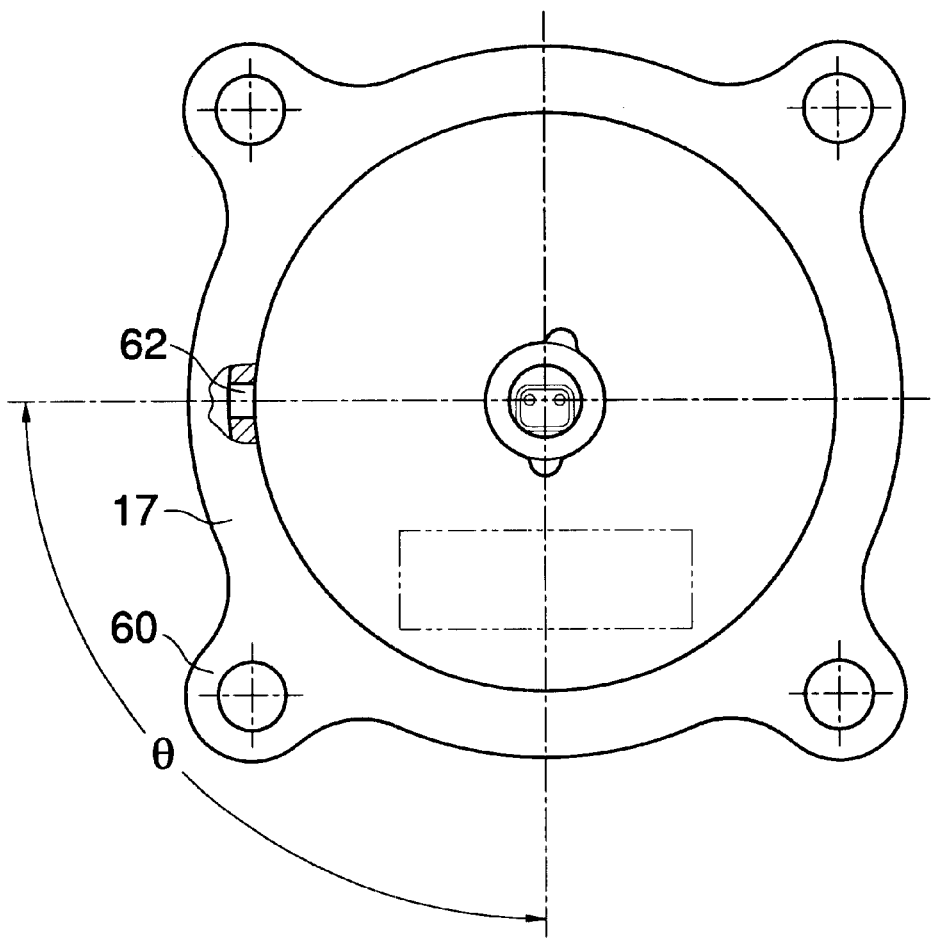
FIG. 6 is a bottom plan view of the inflator taken along line 6—6 of FIG. 1.

FIG. 6 illustrates the mounting means 60 and flange 17. Prior to forming weld 13, the exhaust nozzles 62 preferably are oriented as illustrated in FIG. 6 with angle θ in the range of approximately 88–92°.

Operation of the inflator will be described with reference to FIGS. 2 and 3, it being realized that similar reactions and sequence of events take place in the inflators of FIGS. 4 and 5. Operation of inflator 10 is initiated by an electrical signal received from the vehicle crash-sensing diagnostic system (not shown). This signal is transmitted to the inflator initiator through a dual pin electrical interface. A standard automotive initiator is used to convert the electrical signal into a pyrotechnic output which is used to ignite the ignition-enhancing charge 45 which is positioned about the initiator. The ignition-enhancing charge is a fast-burning, low solids-producing formulation which combusts to form heat and pressure sufficient to burst the 0.001 inch thick copper foil 46, 146 covering the eight gas ports 44, 144.

Upon rupture of the foil 46, 146, the combustion gases from the ignition-enhancing material are released into the gas-generant cup cavity with sufficient temperature and pressure to ignite the main gas-generant charge (e.g., 55 in FIG. 2). The gaseous product from the main generant charge 55 passes through the numerous holes 52 in the gas-generant container 54 and fills the remaining volume (gap 51) of the inflator. Sufficient pressure builds in the pressure vessel to rupture the foil 64 and sealant 66 barrier and the inflator gases flow into and expand the air bag.

In the embodiments of FIGS. 4 and 5, the initiator 222, 322 is used to ignite the main gas-generant charge 255, 355 which is positioned about the initiator 222, 322. The gaseous products from the main generant charge 255, 355 pass through the numerous holes 252, 352 in the gas-generant cup 254, 354 and fill the remaining volume of the inflator. Sufficient pressure builds in the pressure vessel 212, 312 to rupture foil 264, 364 and sealant barrier 266, 366 and the inflator gases flow out of exhaust nozzles 262, 362.

Inflator performance can be tailored by changing the generant composition, amount, configuration and/or the diameter of the exhaust nozzle 62, 162, 262, 362. The thickness of the gas-generant cup 54, 154, 254, 354 and enhancer container 40, 140 are not critical since they do not attach to the closure cap 16, 116, 216, 316 or form structural members of the pressure vessel 12, 112, 212, 312. The thickness of the AIM cup 34, 134, 234 is also not critical since it also forms no structural part of the pressure vessel 12, 112, 212. The generant cup, AIM cup and enhancer container separate and enclose their respective materials but do not form a structural feature of the assembled inflator particularly not a structural feature of the pressure vessel.

Modulated activation is provided by an embodiment of the present invention employing a dual stage inflator as shown in FIGS. 7–16. The dual stage inflator 410 utilizes two independently activatable chambers to modulate the inflation rise rate, peak pressure, and airbag or container volume between a first minimum output level and a second maximum output level.

Figure 7:
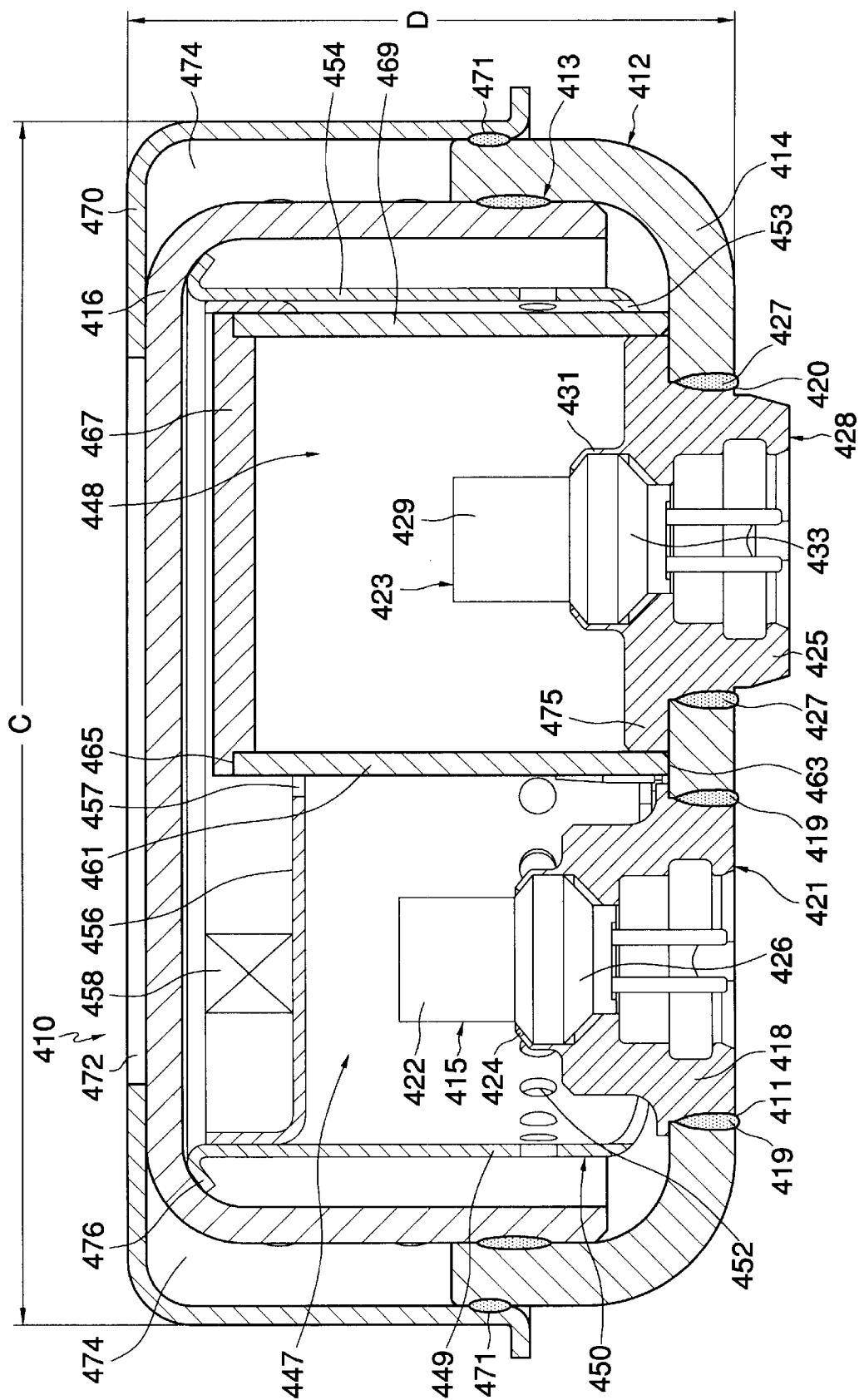
FIG. 7 is a cross-sectional elevation view of a first side of the dual stage embodiment of the invention without generant.
Figure 8:
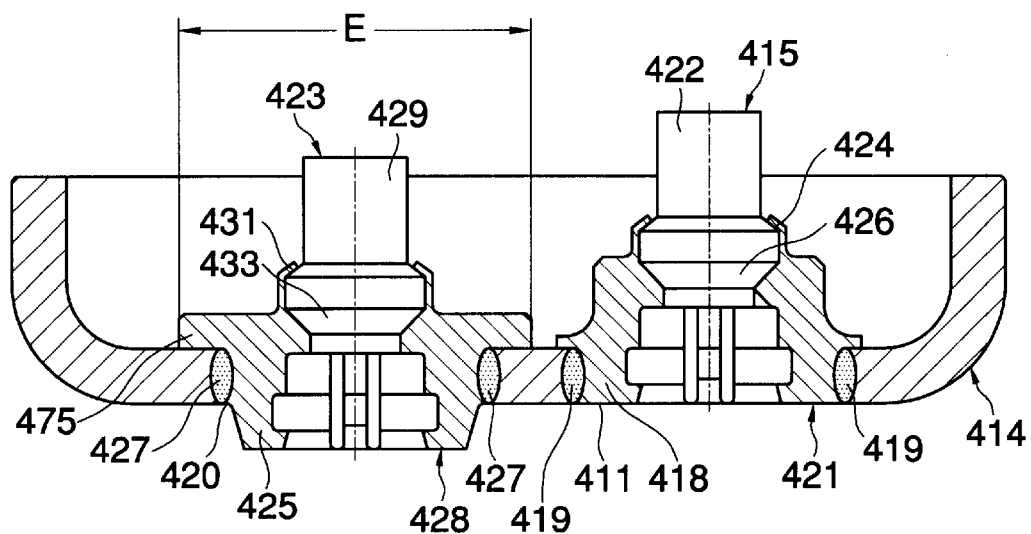
FIG. 8 is a cross-sectional elevation view of the base member of the dual stage embodiment.
Figure 9:
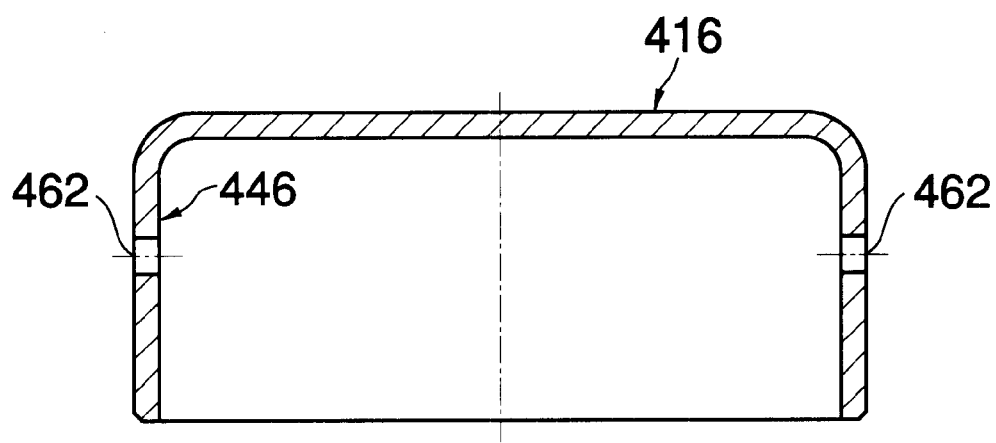
FIG. 9 is a cross-sectional elevation view of the closure-cap of the dual stage embodiment.

Referring to FIGS. 7, 8, and 9, the dual stage inflator 410 utilizes a single pressure vessel 412 having a base member 414 connected to a closure cap 416. The base member may be constructed of any material suitable for the pressure conditions, for example 8000 psi, of the pressure vessel. A suitable construction is a stamped metal cap. The base member 414 and closure cap are fixed together by a weld 413. Preferably, the closure cap 416 fits inside the base member 414. The dual stage inflator 410 is preferably discoidal in shape, varying in overall size only slightly from the single stage inflator, having a diameter C of about 3.1 inches (80 mm) and a height D of about 1.49 to 1.51 inches (37.85 to 40 mm). The materials and operating pressures and temperatures for the dual stage inflator correspond to those of the single stage inflator.

The dual stage inflator 410 includes at least two initiator assemblies disposed in the pressure vessel 412. Preferably, the base member 414 includes two openings, a first opening 411 and a second opening 420 fitted with a first initiator assembly 415 and a second initiator assembly 423 respectively. In order to accommodate the second initiator assembly 423, first opening 411 may be offset from the center of the base member 414. The first initiator assembly 415 includes a first initiator plug 418 extending into the pressure vessel 412 and a first initiator 422, while the second initiator assembly 423 includes a second initiator plug 425 and a second initiator 429. The second initiator plug 425 extends into the pressure vessel 412 and defines an internal collar 475 having a diameter E of about 1 to about 1.5 inches, preferably about 1.08 inches (27.5 mm). The first and second initiators are connected to a sensor system (not shown) capable of activating the initiators.

The first initiator plug 418 preferably is fixed to the base member 414 by a first weld 419 such that the first initiator plug 418 is substantially flush with the base member 414 (although the first initiator plug 418 may protrude slightly from the base member 414), defining a first base region 421. By contrast, the second initiator plug 425 is fixed to the base member 414 by a second weld 427 such that the second initiator plug 425 extends out from the base member 414, thus defining a second base region 428 typically protruding from the pressure vessel 412 more than the first base region 421. Although welds are preferred to fix the initiator plugs to the base member 414, any suitable method of connecting and sealing the initiator plugs to the base member 414 may be utilized.

The first initiator plug 418 and the second initiator plug 425 contain a first crimping flange 424 and a second crimping flange 431, respectively, configured and adapted to retain a standard automotive initiator. The standard initiator and a first initiator seal 426 or second initiator seal 433 are held in place by the crimping flange. The initiator seals help form a gas-tight seal between the initiators and the initiator plugs.

Figure 10:
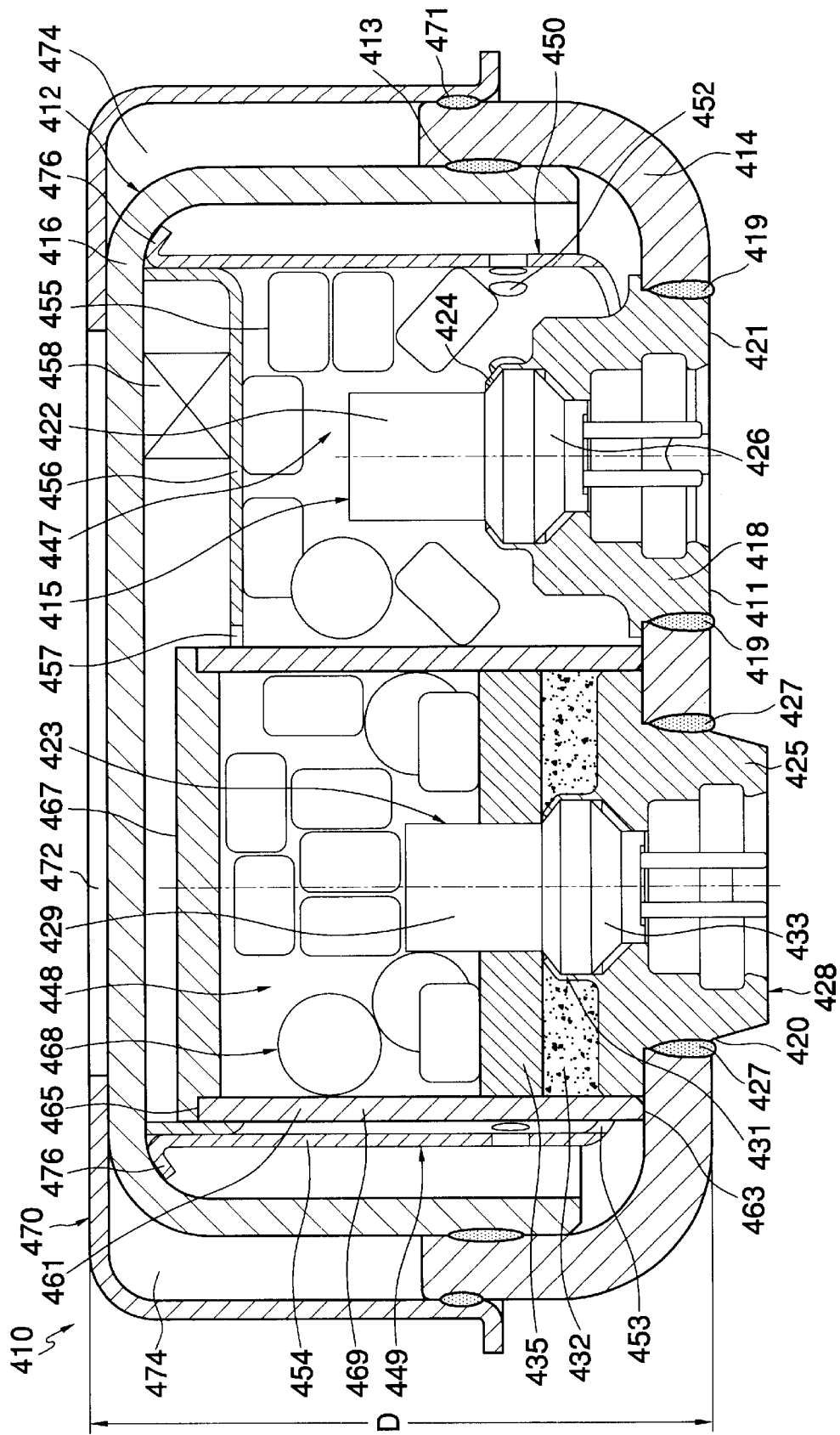
FIG. 10 is a cross-sectional elevation view of a second side of the dual stage embodiment.

Referring now to FIGS. 7 and 10, a gas-generant assembly 450 includes a plurality of chambers each containing a gas-generant charge and a plurality of initiators capable of independently initiating the gas-generant charges to produce the modulated output levels. Preferably, the gas-generant assembly 450 includes at least a first chamber 447 and a second chamber 448. The first chamber 447 includes a gas-generant cup 454 and a first gas-generant charge 455. The gas-generant cup 454 may be of similar construction to that of the single stage inflator including having a plurality of small gas ports 452 in the first gas-generant cup 454 side walls 449 to allow gas to escape while retaining the first gas-generant charge 455 within the first gas-generant cup 454 during combustion. Preferably, the gas ports 452 are located adjacent the bottom of the gas-generant cup 454.

The gas-generant cup 454 may also include a plurality of ears 476 adjacent the open top of the cup for aligning the cup in the closure cap 416. The thickness, structure, and material of the first gas-generant cup 454 is comparable to that in the single stage inflator. Preferably, the first gas-generant cup is neither a structural member adding support to the pressure vessel nor an additional pressure vessel capable of pressurization independent of the pressure vessel 412. The first gas-generant 455 or gas-generating composition is comparable to that of the single stage inflator; however, the amount or load of the first gas generant 455 is generally less than in the single pulse driver, corresponding to a first minimum output level. Alternatively, the gas-generant may include an enhancer or ignition charge coating.

In order to help contain the first gas-generant charge 455 in the gas-generant cup 454 during operation and to prevent any noise or gas-generant pellet rattle which could occur as a result of settling of the first gas-generant 455 and/or movement of the dual stage inflator 410, a stamped metal lid 456 is placed across the open top of the first gas-generant cup 454 and is held in place by either an interference fit between the gas-generant cup 454 and the lid 456 or a standard steel spring or wave washer 458. The lid 456 keeps the first gas-generant 455 in place during handling of the dual stage inflator 410.

The second chamber 448 of the gas-generant assembly 450 is also housed within the pressure vessel 412 and is capable of activation independent of the first chamber 447. In order to achieve this, the second chamber 448 is separated from the first chamber 447. Any arrangement or geometry producing an independent first and second chamber will work, including side-by-side or adjacent arrangements or nested arrangements. Preferably, the second chamber 448 is situated within the gas-generant cup sidewalls 449. Preferably, the second chamber 448 is neither a structural member adding support to the pressure vessel nor an additional pressure vessel capable of pressurization independent of the pressure vessel 412.

Figure 11:
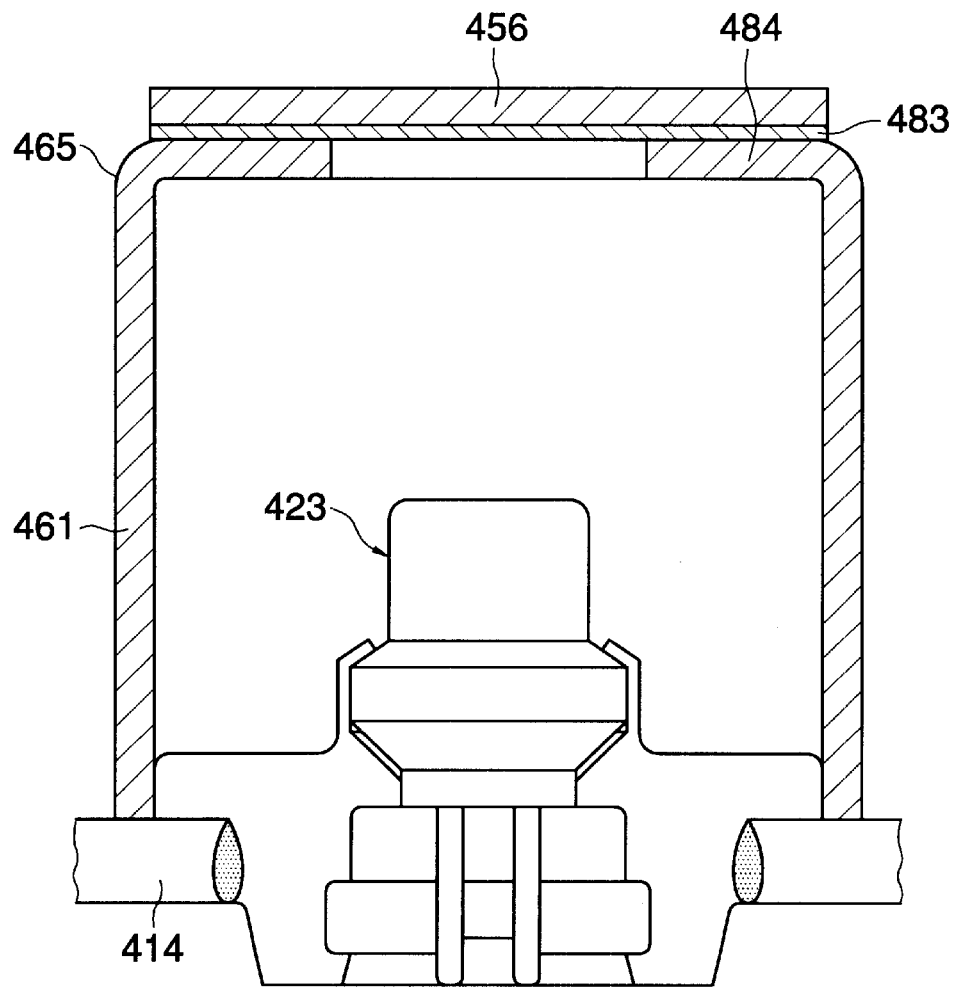
FIG. 11 is a partial cutaway view of another embodiment of the second chamber and one-way seal.

In order to facilitate this orientation of the second chamber 448, the first gas-generant cup 454 includes a base passage 453 and the stamped metal lid 456 includes a lid passage 457 to allow a cylinder 461 to extend through the first gas-generant cup 454. Suitable materials for the cylinder include 300 series stainless steel and 4130 carbon steel. The cylinder 461 is constructed to be capable of withstanding the external pressure applied by the actuation of the first chamber 447 when the second chamber 448 is not actuated. The cylinder bottom 463 is sealed against the base member 414 around the internal collar 475, and the cylinder top 465 is sealed by a one-way seal 467. The one-way seal 467 is preferably press-fit onto the cylinder top 465. Suitable materials for the one-way gas seal 467 include stainless steel and low carbon steel. Alternatively, as is best shown in FIG. 11, the one-way seal 467 may further include an adhesive gasket 483. In this embodiment, the cylinder top 465 includes a seat area 484 for attachment of the adhesive gasket 483. Suitable materials for the adhesive gasket 483 include double sided tape with an elastomeric solid or foam core such as an acrylic or rubber. The second chamber 448 includes a second gas-generant charge 468 of comparable composition to the first gas-generant charge 455, present in an amount sufficient to generate the desired gas pressure, volume, and rise rate, i.e. sufficient to combine with the first output level to generate a second maximum output level when both charges are simultaneously activated.

Figure 12:
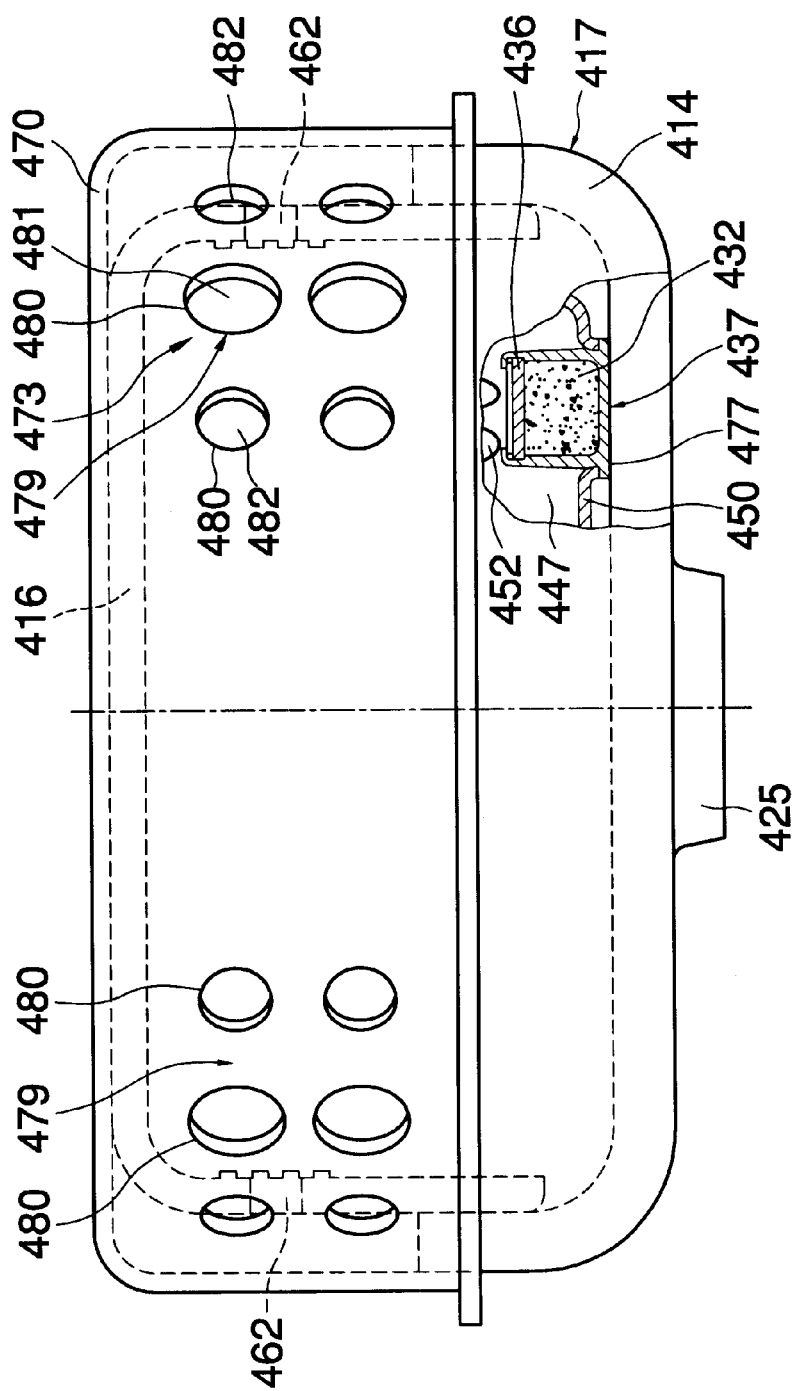
FIG. 12 is a cutaway elevation view of the dual stage embodiment showing an auto-ignition cartridge.
Figure 13:
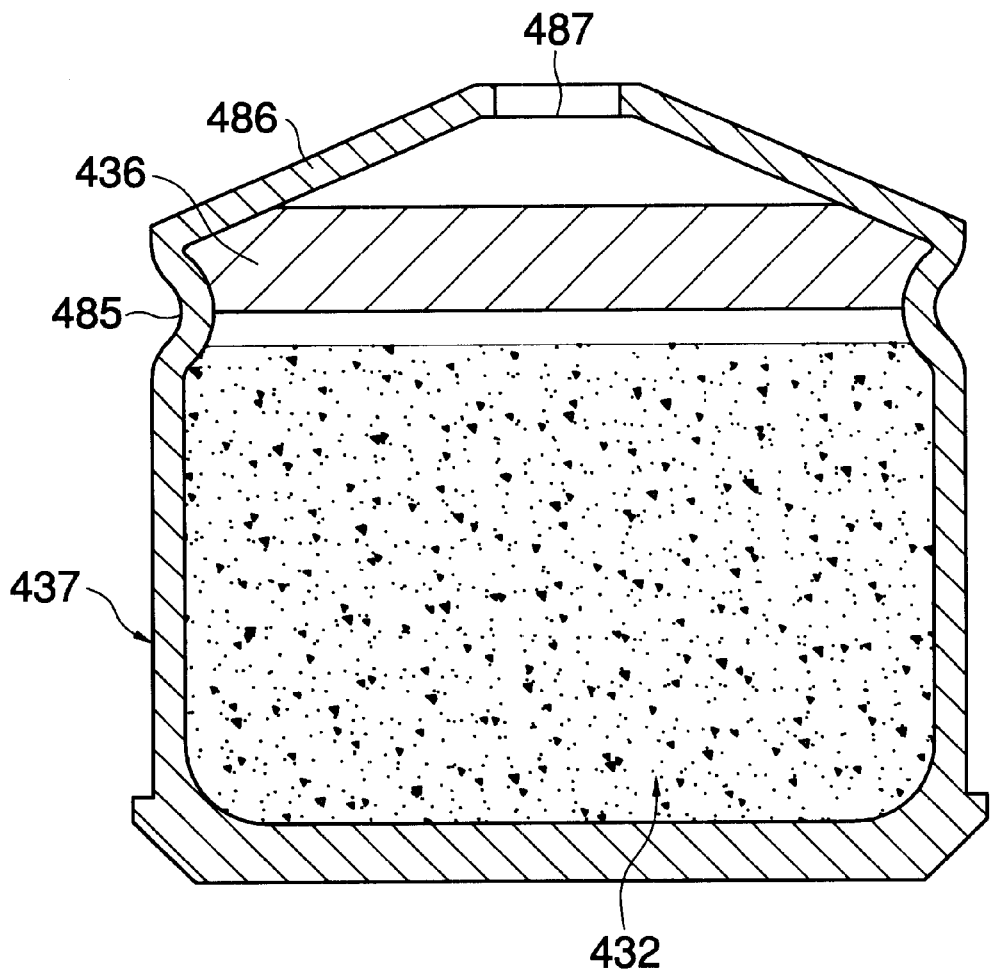
FIG. 13 is a cross-sectional elevation view of an embodiment of an auto-ignition cartridge.
Figure 14:
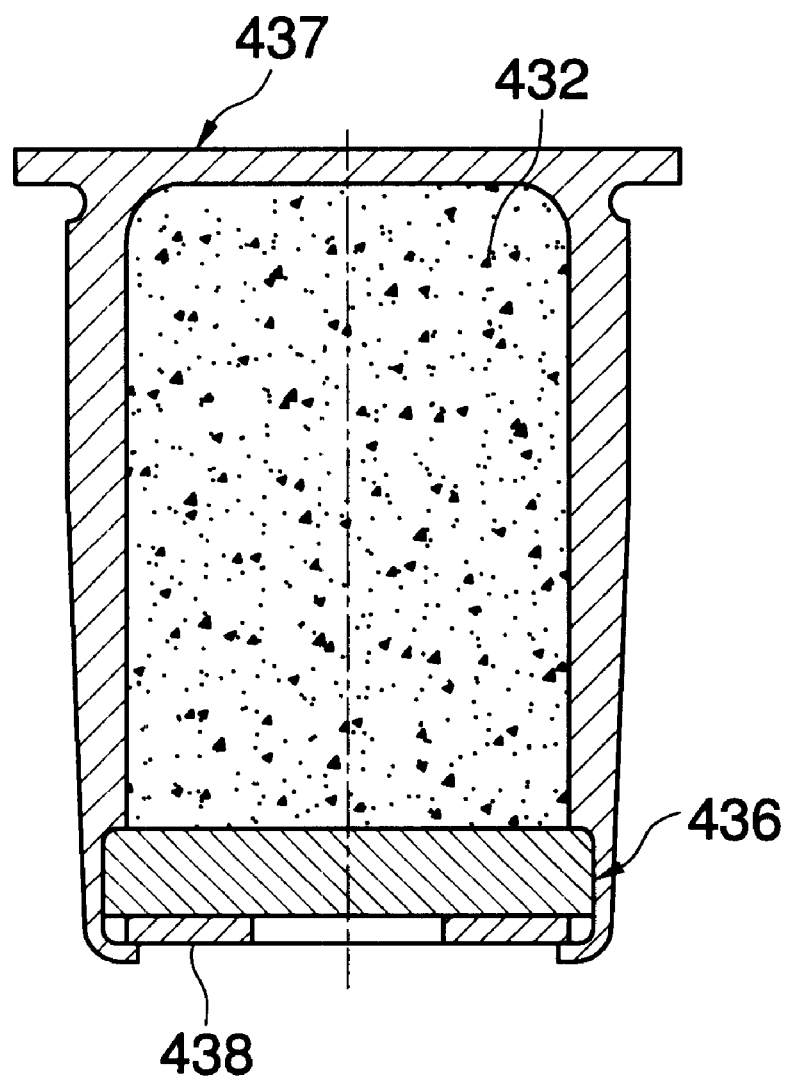
FIG. 14 is a cross-sectional elevation view of a second embodiment of an auto-ignition cartridge.
Figure 15:
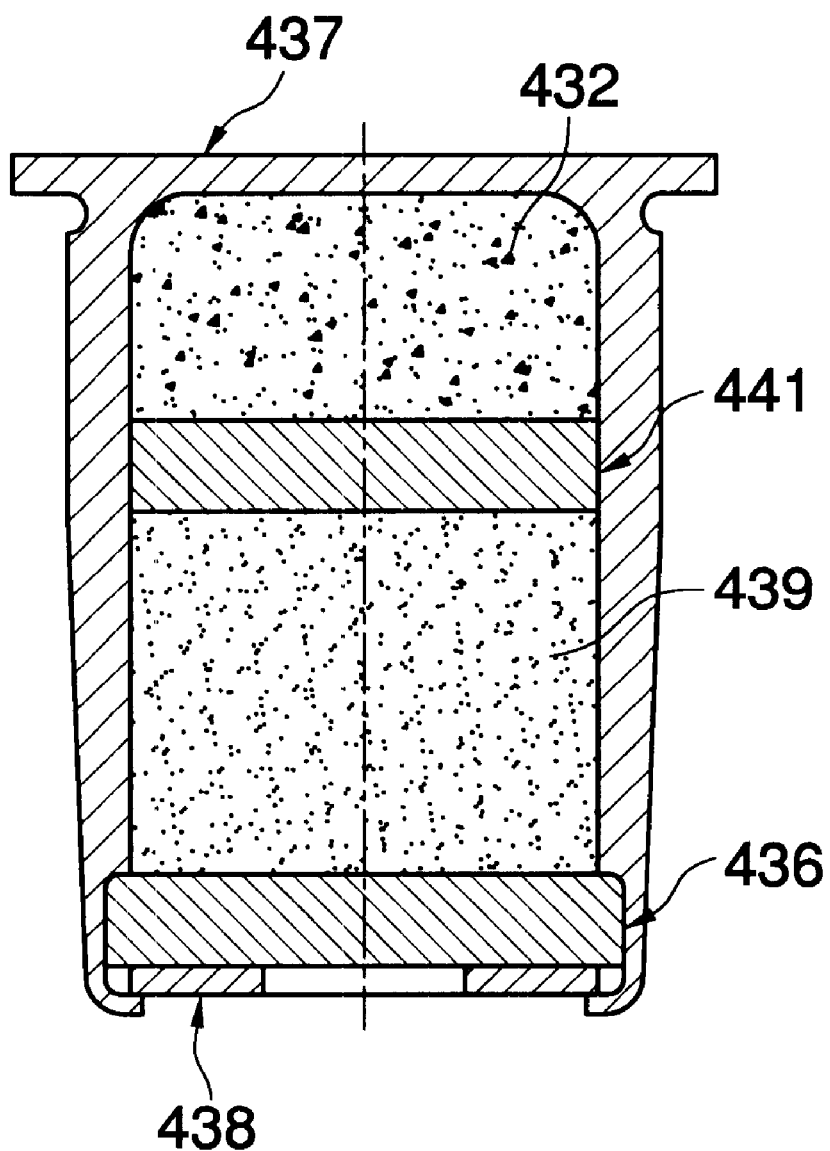
FIG. 15 is a cross-sectional elevation view of a third embodiment of an auto-ignition cartridge.

Again, the AIM powder 432 can be provided to protect the pressure vessel 412. As is best shown in FIG. 10, the AIM powder 432 is preferably located at the bottom of the cylinder 461 between the second initiator 429 and the cylinder wall 469. The AIM powder 432 is bounded on the bottom by the internal collar 475 and on the top by a pad 435. Suitable materials for the pad 435 include cellulose based materials such as blotter paper, fiber board, or cardboard, pressed ceramic fiber materials, and combinations thereof. Alternatively, as is best shown in FIG. 12, the AIM powder 432 may be included in a cartridge 437 passing through an opening 477 in the gas-generant cup 454 into the first chamber 447. The preferred embodiment of the cartridge 437 is shown in FIG. 13. The AIM powder 432 is held in place by a seal 436. In this embodiment, the seal 436 is held in place by an indent 485 in the cartridge 437 and a crimped top 486. The crimped top 486 includes an opening 487 to permit generated gases to escape. Suitable materials for the seal 436 include cellulose based materials such as blotter paper, fiber board, or cardboard, pressed ceramic fiber materials, and combinations thereof. FIG. 14 shows another embodiment of the cartridge 437. In this embodiment, the cartridge 437 further includes a retainer 438 outside the seal 436. Suitable materials for the retainer 438 include steel such as a flat steel washer. FIG. 15 shows yet another embodiment of the cartridge 437. This embodiment further includes a second ignition material 439. The second ignition material 439 does not have to be an auto-ignition material and is used to help ignite the main gas-generant. The second ignition material 439 is separated from the auto-ignition material 432 by a separating seal 441. Suitable materials for the separating seal 441 include cellulose based materials such as blotter paper, fiber board, or cardboard, pressed ceramic fiber materials, and combinations thereof.

The closure cap 416 includes at least one exhaust nozzle 462 to permit the generated gas to exit the pressure vessel 412. Preferably, the pressure vessel includes a plurality of exhaust nozzles oriented so that the net thrust generated is about zero. More preferably, the closure cap 416 includes two exhaust nozzles 462 spaced 1800 apart around the closure cap 416, and upon insertion of the closure cap 416 into the base member 414, the exhaust nozzles 462 are not aligned with the gas ports 452. In another embodiment, the closure cap 416 includes four exhaust nozzles spaced 900 apart. The exhaust nozzles 462 may be sealed with a burst film 446. A shroud 470 covers the closure cap 416. The shroud 470 and base member 414 can be secured together by a shroud weld 471. In order to reduce the overall weight of the dual stage inflator 410, the shroud 471 may include a hole 472 where the shroud 470 intersects the closure cap 416. The shroud 470 covers at least the area of the closure cap 416 containing the exhaust nozzles 462, defining a void space 474 between the shroud 470 and the closure cap 416. Preferably, the void space 474 is not in contact with the hole 472; however, the shroud 470 does include a plurality of vents 473 to allow gas to pass from the void space 474 to the exterior of the shroud 470.

Figure 16:
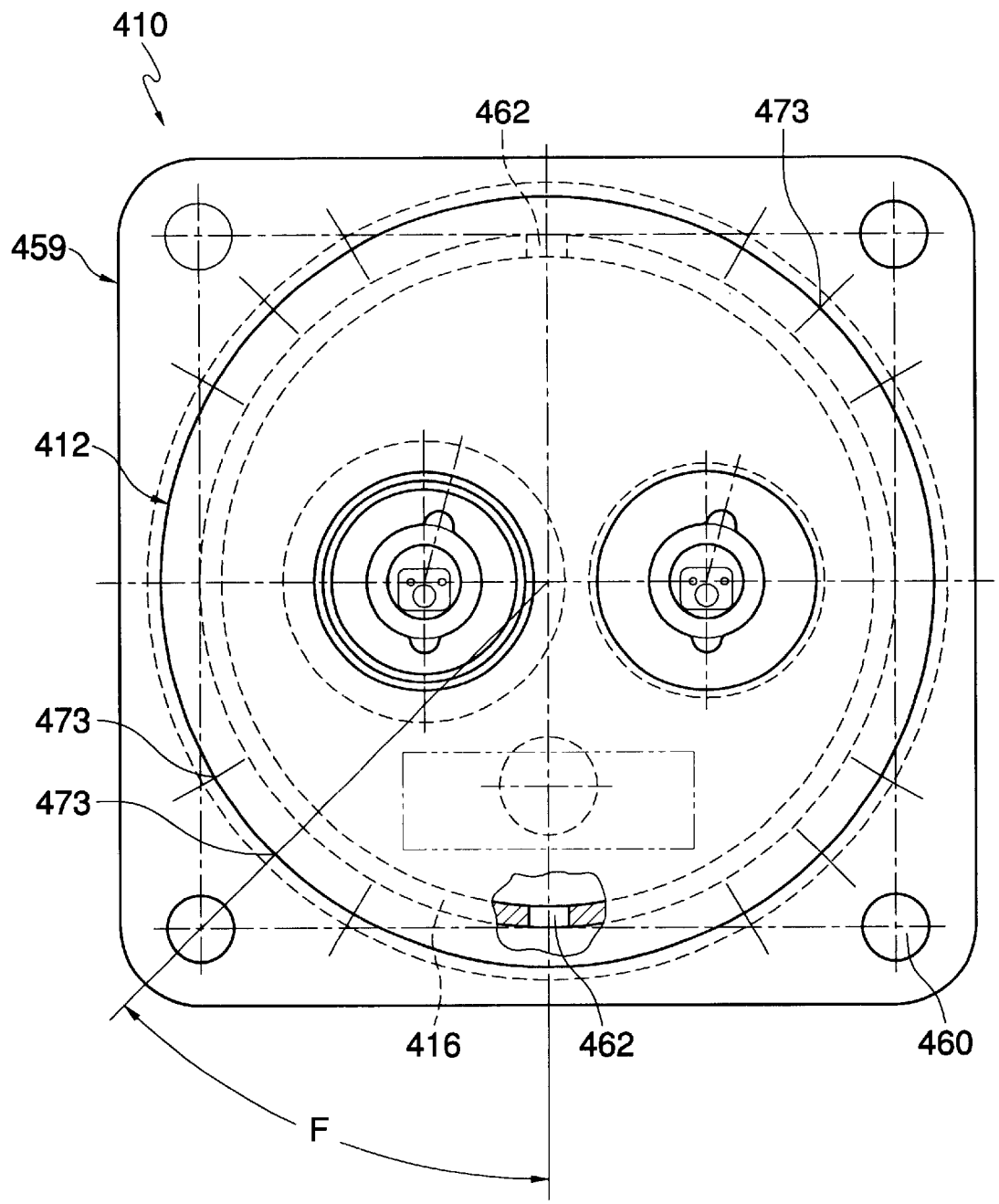
FIG. 16 is a plan view of the bottom of the dual stage embodiment.

As is best shown in FIG. 16, in one embodiment the vents 473 are disposed around the shroud 470 such that they are offset from the exhaust nozzles 462 by an angle F.

Preferably, the angle F is between about 42° and about 48°. Since the gas exiting the exhaust nozzles 462 can have a large cutting pressure potentially capable of damaging an airbag, the offset of the exhaust nozzles 462 and the vents 473 disperses and deflects the gas to avoid such damage. Further, the void space 474 may optionally be filed with a mesh material to act as a heat sink for the gas. The vents are arranged around the shroud 470 according to the design of the pressure vessel or airbag that is to be pressurized. The number and arrangement of vents are selected to direct gas flow to optimize bag inflation and to protect and not damage the airbag material. Preferably, the vents 473 include four sets 479 of vents disposed around the shroud 470 at approximately 90° intervals. Each set 479 includes six vent holes 480 arranged in two parallel lines of three holes each with the center hole 481 in each line being larger than the end holes 482.

In order to attach the dual stage inflator 410, the pressure vessel 412 includes a mounting flange 459 having a plurality of mounting holes 460 distributed around the mounting flange 459. Preferably, the mounting flange 459 is an extension of the shroud 470. The mounting holes 460 are sized and spaced to accept the desired number and type of fasteners, including screws, rivets, and bolts.

In order to activate the dual stage inflator 410, the first and second initiators are connected to a sensor which detects rapid vehicle deceleration and monitors passenger and vehicle conditions including vehicle speed, crash severity, seat back position, passenger weight, passenger size, passenger location, seat belt use, and combinations thereof. Based upon this information, the sensor can initiate either one of the initiators independently or both initiators, either simultaneously or with a delay.

The output of the dual stage inflator may be modulated to produce a gas inflation rate and total gas output level having values between the first, or minimum, output level and the second, or maximum, output level. This modulated output can be produced by staggering the firing time or actuation of the second stage relative to the firing time of the first stage. For example, to produce a first output level the first stage is fired by itself. The second output level is produced when the first stage and the second stage are fired simultaneously. To produce intermediate inflation levels the first stage can be fired first, followed by a second stage firing after the first stage firing at a time delay sufficient to provide the desired inflation rate and total gas output level. Suitable time delays for intermediate inflation levels include from about 10 to about 40 milliseconds.

In airbag applications, the reduction in the total gas output of the inflator reduces the amount of gas in the bag at the time the occupant contacts the bag during a crash event. The second output level is selected to protect the $50^{th}$ percentile unbelted male. An airbag filled by the second output level typically has a pressure inside the bag of about 0.1 to 0.2 atmospheres gage pressure prior to contact of the bag by the occupant, resulting in a bag which is taut. The first output level results in a bag which is less taut. The first inflation level is sized to provide sufficient gas volume in a sufficient time frame to protect an unbelted or belted small stature person during a crash event. Additionally, this first inflation level is adequate to protect a belted $50^{th}$ percentile male. The intermediate output levels are sized to protect occupants of intermediate sizes or to adjust the occupant protection level to match the crash dynamics or severity.

By controlling the sequence of initiation, the dual stage inflator 410 produces a modulated gas output. The first gas-generant charge 455 contained within the first gas-generant cup 454 is initiated by the first initiator 422. The amount of the first gas-generant charge 455 present is selected to provide a first minimum output level of rise rate, volume, and gas pressure in the air bag. Preferably, this amount is less than the amount present in the single stage inflator. Activation of the first initiator 422 only will not directly initiate the second gas-generant charge 468.

Moreover, because the second gas-generant charge 468 is contained within a second chamber 448 independent of the first chamber 447 and the second chamber 448 includes a one-way gas seal 467 that permits gas to escape the second chamber 448 but not to enter the second chamber 448 from the first chamber 447, activation of the first initiator 422 will not indirectly activate the second gas-generant charge 468. Therefore, the gas production is limited to the amount of generant contained within the first chamber 447 when only the first initiator 422 is activated.

Further, because of the arrangement of the first and second chambers, the chambers do not have to be independent pressure vessels, but can be contained within a single pressure vessel. In order to obtain a dual output, two independent, single stage inflators could have been combined; however, this arrangement would undesirably increase the size, weight, and cost of the inflator. Therefore, the present invention, by utilizing a single pressure vessel, realizes significant benefits through savings in size, weight, and cost.

In order to generate a second maximum level of rise rate, gas volume, and gas pressure, both of the first and second initiators are activated simultaneously. The second level will vary among inflator units and temperatures and is particular to the inflator unit and firing conditions. The gas generated in the second chamber 448 exits the second chamber 448 through the one-way gas seal 467 and into the first chamber 447 to combine with the gas concurrently generated in the first chamber 447, that is the first output level, to produce the second output level of gas production which exits the pressure vessel 412. The first chamber 447 and the second chamber 448 charges and their corresponding gases mix together and function as a single charge load with a size equivalent to the sum of the first and the second charge loads. The second initiator 429 does not have to be activated simultaneously with the first initiator and in fact can be delayed slightly. These delays produce intermediate output levels of gas. Alternatively, the second initiator 429 can be fired by itself, causing the first gas-generant charge 455 to activate upon entry of the gas generated in the second chamber 448 into the first chamber 447. This will also produce the second output level of gas production.

Thus, the first output level in combination with the second output level enables the production of a total gas output level modulated between dual outputs. That is the inflator is capable of operation in a first mode of initiating the first chamber only to produce a minimum gas output level, a second mode of initiating the second chamber only to produce a maximum gas output level, a third mode of initiating the first and second chambers simultaneously to produce the maximum gas output level, and a fourth mode of initiating the first chamber followed by the second chamber after a delay to produce an intermediate gas output level. Once the required gas output level is determined, the appropriate mode of operation is selected and the inflator is operated accordingly. Operation in either one of the second or third modes produces a maximum mass of gas pressure and a maximum mass flow rate, and the initiation of the first chamber followed by the second chamber after a delay produces an intermediate mass of gas and an intermediate mass flow rate. The ratio of the maximum mass of gas to the intermediate mass of gas is less than the ratio of the maximum mass flow rate to the intermediate mass flow rate. A further improvement in the level of modulation that may be achieved by the inflator can be achieved by increasing the number of chambers within the pressure vessel and controlling the amount of gas-generant in each chamber and the activation of the chambers.

In order to determine the magnitude of the first output level and the second output level, consideration should be given to the size and pressure of the output and the force or rise rate of the output. In the case of air bag deployment, two factors are important, the force with which the air bag deploys and the size of the inflated air bag in combination with the pressure in the bag. The higher the pressure in the bag the "harder" the bag. Lower bag pressure will produce a "softer" bag that will more readily deform to the passenger. However, the bag must still inflate sufficiently and rapidly enough to protect the passenger.

EXAMPLES

When configuring a dual stage inflator, a determination needs to be made regarding the amount of generant to be placed in each chamber. The information required to make this determination is the maximum bag fill or peak pressure, the slope or rate of rise of the bag, and the desired operating pressure of the pressure vessel or the pressure at which the generant will burn.

Air bag module performance is dictated by the product of gas pressure multiplied by gas volume (PV) that is evolved by the inflator as a function of time. For example, a driver side air bag with an internal volume of 60 liters in the fully inflated state requires a PV product of gas of about 70 to 100 liter atmospheres within the bag at the completion of inflation to fill the bag adequately. This value depends upon the bag design, the bag vent sizes, and the vehicle crash protection requirements. Generally, air bags are filled to about 0.1 to 0.2 atmospheres of over pressure at the completion of inflation, but prior to occupant contact with the bag (about 1.1 to 1.2 atmospheres absolute of pressure in the bag). This level of over pressure is sufficient to provide adequate protection when the occupant collides with the bag. The rate of evolution of this gas PV product is also important. The bag needs to be adequately filled prior to the occupant contacting the bag or the occupant will simply ride through the bag and into the vehicle dash board or steering wheel.

The characterization of the gas PV product evolved by inflators as a function of time can be performed independent of tests in air bags by discharging the inflator into a sealed tank and recording the pressure versus time evolved in the tank. The PV product is proportional to the pressure evolved versus time and may be obtained by multiplying the pressure by the volume of the tank. Differences in heat sinking and other nonidealities have some effect on how this correlates to the performance of the inflator in the bag, but for a given inflator type this testing generally correlates to bag performance.

Generally, tests are performed in sealed tanks which are initially filled with air at one atmosphere of pressure absolute. Performing the tests in an evacuated tank would result in more accurate data from one inflator type to another, but the convenience of the air filled tank test is usually considered more important than the ability to correlate between different types of inflators. The pressure versus time measurements are taken in gauge pressure and, therefore, begin at zero and increase as the inflator fills the tank with gas. The two key characteristics that are used to discuss an inflator's performance characteristics are the peak tank pressure achieved in a closed tank test (kilopascals gauge pressure) and the maximum slope of the pressure versus time curve for the tank test (kilopascals per millisecond). These two characteristics quantize a specific inflator's total gas output and rate of gas output respectively, that is how completely and how quickly an inflator will fill an air bag.

The operating principals of the dual stage inflator can be illustrated by the ballistic equations for the combustion of solid propellant in a pressure vessel having at least one nozzle with a fixed total effective flow area. A ballistic equation showing the relationship between operating pressure in a gas generator, nozzle effective flow area, and propellant or gas generant burn surface area for a fixed gas generant is as follows:

$$\frac{P_2}{P_1} \propto \left(\frac{K_{n2}}{K_{n1}}\right)^{(1/1-n)}$$

Where $P_2$ and $P_1$ are the operating pressures in the gas generator for two different burn surface area to effective nozzle area ratios. $K_{n2}$ and $K_{n1}$ are the ratios of burn surface area to effective nozzle area for the two different gas generant loads, and n is the pressure exponent of the gas generant formulation. For most common gas generants the value of n is about 0.5 to 0.6. For a given inflator design, nozzle size, gas generant type, and tablet geometry, the effect of varying the gas generant charge load mass on operating pressure can be defined by the above equation. Of course, this assumes that heat transfer and mass of gas held in the pressure vessel at operating pressure have negligible effect on the ballistic performance. This assumption is only partially true. Other factors such as the gas generant's dynamic combustion characteristics, that is, the tendency of a gas generant to burn at rates different than the steady state burn rate during rapid pressurization and depressurization, as well as other non-ideal factors tend to make the exact effect of varying the gas generant charge load, for example by firing the first chamber only as compared to the firing the first chamber and the second chamber together, hard to predict absent empirical data. The following example illustrates modulation of the inflator gas output.

Example 1

Figure 17:
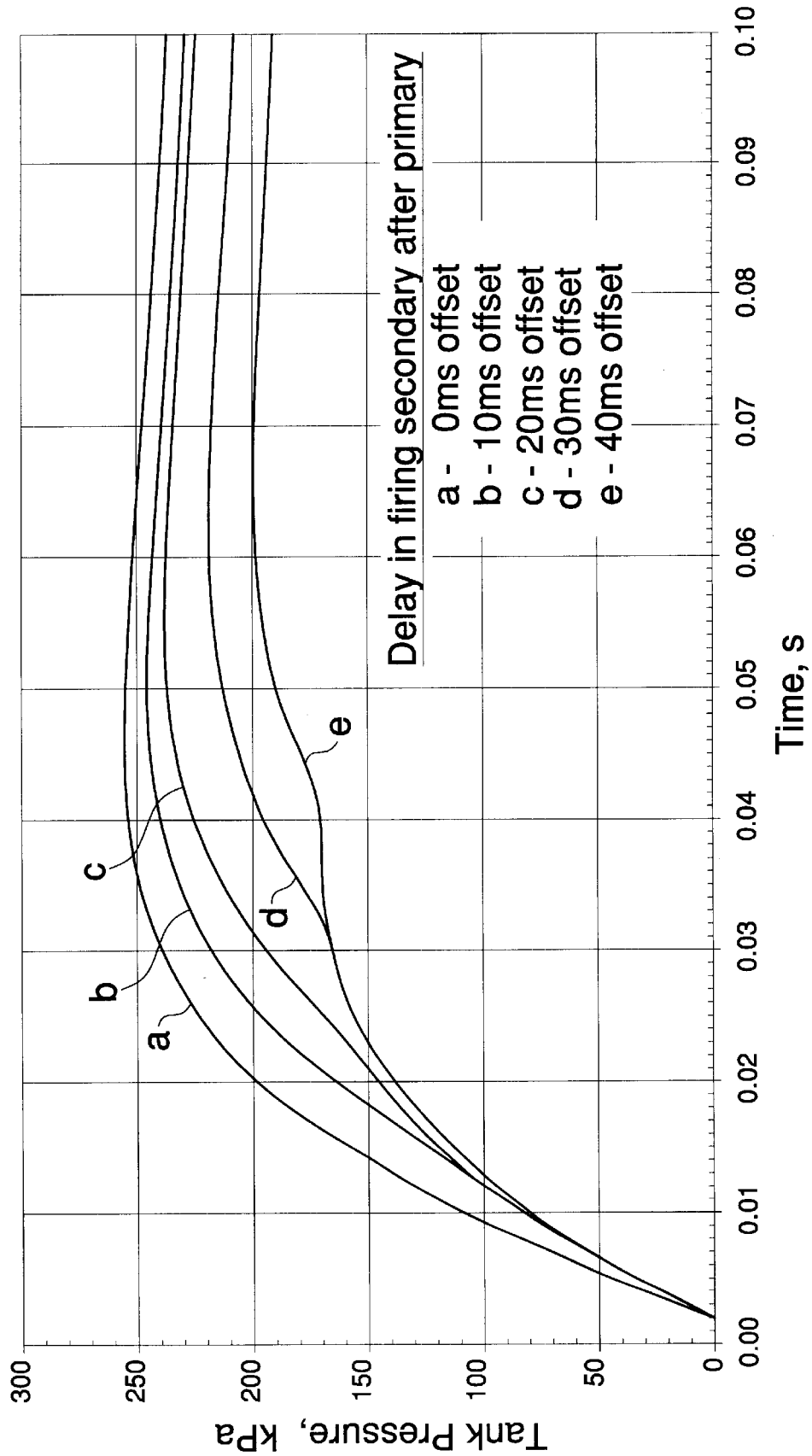
FIG. 17 is a plot of the pressure generated in a closed tank versus time for the inflator of FIG. 7.

The dual stage inflator shown in FIG. 7 was loaded with gas-generant tablets pressed into tablets having about 0.25 inch diameter, an average thickness of about 0.15 inches, and conolodated to a density of about 1.63 g/cc. The tablets were further coated with about 8% by weight of an ignition coating. The gas-generant tablets include about 58.5% by weight of 10 micron average particle size guanidine nitrate, 23.5% by weight 15 micron average particle size ammonium perchlorate, 17.8% by weight 10 micron average particle size sodium nitrate, and 0.2% by weight fumed silica. The ignition coating includes about 20.23% by weight of glycidal azide polymer polyol, commercially available from 3M Speciality Chemicals of Cottage Grove, Minn., 2.50% by weight SR444 (pentaerythritol triacrylate), commercially available from SARTOMER Company of Exton, Pa., 0.5% by weight HX868, commercially available from 3M Speciality Chemicals of Cottage Grove, Minn., and 0.5% by weight of a carbon black such as Raven 850, commercially available from Columbian Chemicals Company of Tulsa, Okla., 32.35% by weight 10 micron average particle size sodium nitrate, 40.25% by weight 10 micron average particle size ammonium perchlorate, 2.00% by weight Nanocat (ultra fine ferric oxide), commercially available from Mach 1 of King of Prussia, Pa., and 1.67% by weight glycidal azide polymer plasticizer, commercially available from 3M Speciality Chemicals of Cottage Grove, Minn. The dual stage inflator was loaded such that the first chamber contained 22.6 grams of the gas-generant, and the second chamber contained about 3.4 grams of the gas-generant. The initiators used were standard automotive airbag initiators such as those commercially available from Special Devices, Incorporated of Newhall, Calif. loaded with 200 milligrams of $BKNO_3$ (boron potassium nitrate). The inflator had two sharp edged output nozzles each having a diameter of about 0.137". These units were fired into a 60 liter closed tank initially filled with one atmosphere of air absolute and the change in pressure versus time in the tank was recorded. The initiator in the second chamber was fired with a time delay relative to the firing time of the initiator in the first chamber. The delay times used were 0, 10, 20, 30, and 40 milliseconds. The trace of pressure versus time for these tests is provided in FIG. 17.

Generally, the slope of the pressure versus time trace for an inflator firing into a closed tank is proportional to the operating pressure in the inflator vessel for a given effective nozzle area.

Slope $P_{vessel}$

When the first chamber only is fired, the operating pressure in the inflator vessel is a minimum. When the first and second chambers are fired simultaneously the operating pressure in the inflator vessel is a maximum. According to the ballistic equation, as the surface area of the propellant increases with a fixed nozzle area, as is the case when both chambers are fired simultaneously, the operating pressure increases proportional to the surface area increase raised to the power of $(1/1-n)$. So:

$$\frac{P_2}{P_1} = \left(\frac{\left(\frac{Second\ Surface\ Area\ of\ Load}{Second\ Nozzle\ Area}\right)}{\left(\frac{First\ Surface\ Area\ of\ Load}{First\ Nozzle\ Area}\right)}\right)^{1/1-n}$$

$$= \left(\frac{Second\ Surface\ Area\ of\ Load}{First\ Surface\ Area\ of\ Load}\right)^{1/1-n}$$

For most propellants $1/1-n$ is approximately 2, therefore, the operating pressure should increase by about the square of the increase in surface area.

$$\frac{P_2}{P_1} = \left(\frac{Second\ Surface\ Area\ of\ Load}{First\ Surface\ Area\ of\ Load}\right)^2$$

When the same gas-generant geometry and type are used in both the first and the second chambers, the ratio of surface areas is equal to the load mass ratio. For the present example, the ratio of the load in the first and second chambers to that in the first chamber alone is 26 grams to 22.4 grams, or about 1.16:1. Based on this load ratio, the operating pressure ratio between the second level of gas output and the first level of gas output is expected to be:

$$\frac{P_2}{P_1} = \left(\frac{Total\ Load\ Mass}{First\ Chamber\ Load\ Mass}\right)^2$$

$$\frac{P_2}{P_1} = \left(\frac{26}{22.4}\right)^2$$

$$\frac{P_2}{P_1} = (1.16)^2 = 1.34$$

Since the slope of pressure versus time for the closed tank curve is roughly proportional to the operating pressure:

$$\frac{SLOPE_2}{SLOPE_1} = \frac{P_2}{P_1} = 1.3$$

The ratio of peak tank pressures for the second level of gas output to the first level of gas output is not as easily predicted. Typically, this ratio is about equal to the mass load ratio of first plus second load, or total load, to first load because the pressure in the tank is generally proportional to the mass of gas discharged into the tank for a fixed set of gas properties.

$$\frac{Peak\ Pressure_2}{Peak\ Pressure_1} = \frac{Total\ Mass\ Load}{First\ Chamber\ Mass\ Load}$$

Since the slope is equal to the square of the same ratio, for a given reduction in peak pressure a greater reduction in slope can be achieved. Therefore, an air bag can be inflated at a slow enough rate without undesirably reducing the ultimate size of the bag. For example, by reducing the peak pressure or total mass of gas by 30% a 50% reduction in slope or mass flow rate is realized. The actual ratio measured, however, can vary from the ideal case as the result of non-ideal characteristics which were not accounted for in the equations. Such characteristics include heat transfer, the mass of gas held up in the vessel, and dynamic combustion characteristics.

Additional modifications and advantages will readily occur to those skilled in the art and the invention is not limited to the specific details and representative devices shown and described. For example, other gas-generating compositions and enhancer compositions may be used as well as a variety of materials and construction techniques. Moreover, the pressure vessel may have other shapes which do not include a central post structure. Accordingly, departures may be made from the details and examples shown without departing from the spirit or scope of the general inventive concept as defined by the appended claims and their equivalents.

What is claimed is:

1. A dual stage inflator capable of producing a gas output modulated between at least a first output level and a second output level, said dual stage inflator comprising:
   (a) a single pressure vessel, said pressure vessel comprising at least one exhaust nozzle adapted to permit passage of gases within said pressure vessel out of said pressure vessel;
   (b) a first non-pressurizable chamber within said pressure vessel, said first non-pressurizable chamber comprising:
      (i) a first gas-generant charge present in an amount sufficient to generate the first output level;
      (ii) a first initiator assembly adjacent said first gas-generant charge and capable of initiating said first charge;
      (iii) a first gas-generant cup comprising at least one sidewall, and containing the first gas-generant charge; and
      (iv) a lid positioned across an open top of the first gas-generant cup; and
   (c) a second non-pressurizable chamber within said pressure vessel, said second non-pressurizable chamber comprising:
      (i) a second gas-generant charge present in an amount sufficient to combine with the first gas-generant charge to generate the second output level; and
      (ii) a second initiator assembly adjacent said second gas-generant charge and capable of initiating said second charge independent of said first charge; wherein
   said second chamber is separated from said first chamber by a one-way seal comprising a second chamber lid, said second chamber lid configured and adapted to inhibit passage of gas from said first chamber to said second chamber prior to initiation of said second gas-generated charge, and, upon combustion of said second gas-generant charge, to at least partially open, thereby forming an opening defined by said second chamber lid and said second chamber to permit passage of gas from said second chamber to said first chamber upon initiation of said second gas-generant charge, and wherein the second chamber is disposed within the at least one sidewall, and the first and second chambers do not add structural support to the pressure vessel.

2. The inflator of claim 1, wherein the pressure vessel is discoidal in shape.

3. The inflator of claim 1, wherein the first gas-generant cup further comprises a plurality of gas ports disposed around the sidewalls, the gas ports not aligned with the exhaust ports.

4. The inflator of claim 1, wherein the second chamber comprises a cylinder having a bottom and a top and extending into the first chamber, the cylinder bottom sealed against the pressure vessel and the cylinder top sealed by the one-way gas seal.

5. The inflator of claim 4, wherein the first and second gas-generant charges have an ignition temperature, and comprising an auto-ignition powder for igniting the gas-generant charge at a temperature lower than the ignition temperature of the gas-generant charges.

6. The inflator of claim 5, wherein the auto-ignition powder is disposed adjacent the cylinder bottom in the second chamber and is bounded by cylinder walls, an internal collar of the second initiator assembly sealing the cylinder bottom, and a pad.

7. The inflator of claim 5, wherein the auto-ignition powder is disposed within a cartridge, and the cartridge passes through the first gas-generant cup into the first chamber.

8. The inflator of claim 1, wherein the pressure vessel further comprises a plurality of exhaust nozzles disposed in the pressure vessel and arranged to produce a net force on the pressure vessel of about zero.

9. The inflator of claim 8, further comprising a shroud covering the pressure vessel, the shroud comprising a plurality of vents disposed around the shroud, the vents not aligned with the exhaust nozzles.

10. The inflator of claim 9, wherein the vents are spaced around the shroud at an angle from about 42° to about 48°.

11. The inflator of claim 1, further comprising a sensor connected to the first and second initiator assemblies and capable of initiating the initiator assemblies either independently or simultaneously.

12. The inflator of claim 11, wherein the sensor detects rapid vehicle deceleration and initiates the initiator assemblies based on vehicle speed, crash severity, seat position, passenger weight, passenger size, seat belt use, passenger location, or combinations thereof.

13. The inflator of claim 11, wherein the second initiator assembly is initiated after the first initiator assembly to produce at least one intermediate output level.

14. The inflator of claim 13, wherein the second initiator assembly is initiated after the first initiator following a delay after the initiation of the first initiator of about greater than 0 milliseconds to about 40 milliseconds.

15. The inflator claim 1 further wherein the gas-generant charges comprise a non-azide, low-solids producing gas-generating composition, said composition producing a gaseous product upon combustion.

16. The inflator of claim 15 wherein said gas-generating composition further comprises an ignition material coating.

17. The inflator of claim 16 comprising from 54 to about 67 percent guanidine nitrate and from about 33 to about 46 percent oxidizer wherein the oxidizer comprises ammonium perchlorate and sodium nitrate in a mole ratio of about 1 mole of ammonium perchlorate to about 1 to about 4 moles of sodium nitrate.

18. The inflator of claim 17 wherein the gas-generating composition comprises about 55–65 percent guanidine nitrate, about 20–25 percent ammonium perchlorate and about 15–20 percent sodium nitrate.

19. The inflator of claim 16 wherein the gas-generating composition comprises about 59 percent guanidine nitrate, about 23 percent ammonium perchlorate and about 18 percent sodium nitrate.

20. The inflator of claim 1, wherein the inflator is a filterless inflator.

21. An air bag system for use in an automobile, comprising:
   (a) an air bag having an open end; and
   (b) the dual stage inflator according to claim 1 disposed in the open end for inflating the air bag at either a first or a second rate to either a first or a second peak upon detection of rapid vehicle deceleration.

22. The dual stage inflator of claim 1, wherein said pressure vessel comprises a base member defining at least a first aperture and a second aperture, wherein said first aperture of said base member is configured and adapted to position said first initiator assembly adjacent said first gas-generant charge, and said second aperture of said base member is configured and adapted to position said second initiator assembly adjacent said second gas-generant charge.

23. The inflator of claim 1, wherein the dual stage inflator is filterless.

24. The dual stage inflator of claim 23, wherein the first and second gas-generant charges produce no more than about 15 percent by weight solids on combustion.

25. A dual stage inflator capable of producing at least a first output level and a second output level, comprising:
   (a) a pressure vessel, said pressure vessel comprising at least one exhaust nozzle adapted to permit passage of gases within said pressure vessel out of said pressure vessel;
   (b) a first chamber within said pressure vessel, comprising:
      (i) a first gas-generant cup comprising at least one sidewall; and
      (ii) a lid positioned across an open top of the first gas-generant cup;
      (iii) a first gas-generant charge disposed in the first gas-generant cup and present in an amount sufficient to generate the first output level; and
      (iv) a first initiator assembly adjacent said first gas-generant charge and capable of initiating said first charge; and
   (c) a second chamber within said pressure vessel and separated from said first chamber by a one-way seal, said second chamber comprising:
      (i) a cylinder having a bottom and a top and extending into the first chamber, the cylinder bottom sealed against the pressure vessel and the cylinder top sealed by the one-way gas seal;
      (ii) a second gas-generant charge disposed in the cylinder and present in an amount sufficient to generate enough output to combine with the first output level to form the second output level; and
      (iii) a second initiator assembly adjacent the second gas-generant charge and capable of initiating said second charge independent of the first charge.

26. A method for producing a total gas output level modulated between a first gas output level and a second gas output from a dual stage inflator having a single pressure vessel comprising at least two non-pressurizable independently initiatable chambers, the dual stage inflator comprising a first mode of operation in which the first chamber only is initiated to produce a minimum gas output level, a second mode of operation in which the second chamber only is initiated to produce a maximum gas output level, a third mode of operation in which the first and second chambers are initiated simultaneously to produce the maximum gas output level, and a fourth mode of operation in which the first chamber is initiated followed by initiation of the second chamber after a delay to produce an intermediate gas output level, comprising:
   (a) determining the total output level; and
   (b) selecting an appropriate mode of operation, wherein initiation of either one of the second or third modes of operation produces a maximum mass of gas pressure and a maximum mass flow rate and the initiation of the first chamber followed by the second chamber after a delay produces an intermediate mass of gas and an intermediate mass flow rate, and the ratio of the maximum mass of gas to the intermediate mass of gas is less than the ratio of the maximum mass flow rate to the intermediate mass flow rate.

27. A dual stage inflator capable of producing a gas output modulated between at least a first output level and a second output level, said dual stage inflator comprising:
   (a) a pressure vessel, having a discoidal shape, and comprising at least one exhaust nozzle adapted to permit passage of gases within said pressure vessel out of said pressure vessel;
   (b) a first non-pressurizable chamber within said pressure vessel, said first non-pressurizable chamber comprising:
      (i) a first gas-generant charge present in an amount sufficient to generate the first output level; and
      (ii) a first initiator assembly adjacent said first gas-generant charge and capable of initiating said first charge; and
   (c) a second non-pressurizable chamber within said pressure vessel, said second non-pressurizable chamber, comprising:
      (i) a second gas-generant charge present in an amount sufficient to combine with the first gas-generant charge to generate the second output level; and
      (ii) a second initiator assembly adjacent said second gas-generant charge and capable of initiating said second charge independent of said first charge; wherein
   said second chamber is separated from said first chamber by a one-way seal comprising a second chamber lid, said second chamber lid configured and adapted to inhibit passage of gas from said first chamber to said second chamber prior to initiation of said second gas generant charge, and, upon combustion of said second gas-generant charge, to at least partially open, thereby forming an opening defined by said second chamber lid and said second chamber to permit passage of gas from said second chamber to said first chamber upon initiation of said second gas-generant charge.

28. A method for producing a total gas output level modulated between a first gas output level and a second gas output level from a dual stage inflator having a single pressure vessel comprising at least two non-pressurizable independently initiatable chambers, the dual stage inflator comprising a first mode of operation in which the first chamber only is initiated to produce a minimum gas output level, a second mode of operation in which the second chamber only is initiated to produce a maximum gas output level, a third mode of operation in which the first and second chambers are initiated simultaneously to produce the maximum gas output level, and a fourth mode of operation in which the first chamber is initiated followed by initiation of the second chamber after a delay to produce an intermediate gas output level, comprising:

(a) determining the total output level; and (b) selecting an appropriate mode of operation; wherein initiation of either one of the second or third modes of operation produces a maximum mass of gas pressure and a maximum mass flow rate and the initiation of the first chamber followed by the second chamber after a delay produces an intermediate mass of gas and an intermediate mass flow rate, and the ratio of the maximum mass of gas to the intermediate mass of gas is less than the ratio of the maximum mass flow rate to the intermediate mass flow rate.

* * * * *